(12) United States Patent
Stein et al.

(10) Patent No.: US 12,724,446 B2
(45) Date of Patent: Sep. 1, 2026

(54) HANDLEBAR TYPE INPUT DEVICE

(71) Applicant: Creative Drones Inc., Lewes, DE (US)

(72) Inventors: Alan R. Stein, Petaluma, CA (US); Joaquin Aguerrebere Gutierrez, Quintana Roo (MX)

(73) Assignee: Creative Drones Inc., Lewes, DE (US)

( * ) Notice: Subject to any disclaimer, the term of this patent is extended or adjusted under 35 U.S.C. 154(b) by 0 days.

(21) Appl. No.: 19/153,282

(22) PCT Filed: Feb. 27, 2025

(86) PCT No.: PCT/US2025/017559
§ 371 (c)(1),
(2) Date: Aug. 1, 2025

(87) PCT Pub. No.: WO2025/184323
PCT Pub. Date: Sep. 4, 2025

(65) Prior Publication Data

US 2026/0111052 A1 Apr. 23, 2026

Related U.S. Application Data

(60) Provisional application No. 63/560,278, filed on Mar. 1, 2024.

(51) Int. Cl.
*G05G 9/047* (2006.01)
*G05D 1/222* (2024.01)
(Continued)

(52) U.S. Cl.
CPC ......... *G05G 9/04737* (2013.01); *G05D 1/222* (2024.01); *G06F 3/011* (2013.01);
(Continued)

(58) Field of Classification Search
CPC ............... G05G 9/047; G05G 9/04737; G05G 2009/0474; G05G 2009/04748;
(Continued)

(56) References Cited

U.S. PATENT DOCUMENTS 3,260,826 A * 7/1966 Johnson ................. H01H 25/04 338/68
3,295,386 A * 1/1967 Menefee ................. B64C 13/30 244/234

(Continued)

FOREIGN PATENT DOCUMENTS

EP 3183633 B1 5/2022
GB 2184817 A * 7/1987 ............ A63F 13/90

(Continued)

OTHER PUBLICATIONS

International Search Report and Written Opinion in International Appln. No. PCT/US2025/017559, mailed on Jun. 26, 2025, 15 pages.

*Primary Examiner* — Adam D Rogers
(74) *Attorney, Agent, or Firm* — Fish & Richardson P.C.

(57) ABSTRACT

The subject matter of this specification can be embodied in, among other things, a handlebar-shaped housing having an elongate central body having a first hand grip at a first axial end, a first flexible paddle affixed to the first hand grip, a first deflection sensor configured to identify a first amount of deflection of the first flexible paddle, a second hand grip at a second axial end, a second flexible affixed to the second hand grip, a second deflection sensor configured to identify a second amount of deflection of the second flexible paddle, and circuitry configured to identify one or more of a pitch, a roll, and a yaw of the elongate central body, and a controller configured to receive an orientation sensor signals, deflection signals from the deflection sensors, and provide a control signal based on one or more of the sensor signals.

17 Claims, 34 Drawing Sheets

(51) Int. Cl.
*G06F 3/01* (2006.01)
*G06F 3/0346* (2013.01)

(52) U.S. Cl.
CPC ........ *G06F 3/0346* (2013.01); *B64U 2201/20* (2023.01); *G05G 2009/04748* (2013.01); *G05G 2009/04774* (2013.01)

(58) Field of Classification Search
CPC .......... G05G 2009/04751; G05G 2009/04774; G05G 2009/04781; G05D 1/0016; G05D 1/0808; G05D 1/222; B64U 2201/20; B64C 13/0421
See application file for complete search history.

(56) References Cited

U.S. PATENT DOCUMENTS

| | | | | |
|---|---|---|---|---|
| 3,304,799 | A * | 2/1967 | Menefee | G05G 7/10<br>74/519 |
| 3,573,412 | A * | 4/1971 | Uhrich | H01H 17/00<br>200/329 |
| 5,764,164 | A * | 6/1998 | Cartabiano | G06F 3/014<br>400/100 |
| 7,793,890 | B2 * | 9/2010 | Scherer | A63H 30/04<br>244/190 |
| 11,579,709 | B2 * | 2/2023 | Stack | G06F 3/0338 |
| 12,547,204 | B2 * | 2/2026 | Gernaert | G05G 9/047 |
| 2018/0067545 | A1 * | 3/2018 | Provancher | G06F 3/011 |

FOREIGN PATENT DOCUMENTS

| | | | | |
|---|---|---|---|---|
| KR | 10-1686585 | B1 | 12/2016 | |
| KR | 102021873 | B1 * | 9/2019 | G05D 1/0016 |
| WO | WO 2020/141227 | A1 | 7/2020 | |

* cited by examiner

CRYSTALS

3100
3102
3104
3106
3108
3110
3112
3113
3114
3115
3116
3117
3120
3122
3124
3150
3152
3154
3156
3158
3160
3162
3164
3166
3168
3170
3172
3174
3180
3182

HANDLEBAR TYPE INPUT DEVICE

CROSS-REFERENCE TO RELATED APPLICATIONS

This application is a U.S. National Stage application of and claims benefit of priority under 35 U.S.C. § 371 to International Application No. PCT/US2025/017559 filed on Feb. 27, 2023, which claims the benefit of U.S. Provisional Patent Application Ser. No. 63/560,278, entitled HANDLEBAR TYPE INPUT DEVICE, filed on Mar. 1, 2024, which is incorporated herein by reference.

TECHNICAL FIELD

The instant specification relates to human-machine interfaces, more specifically user input controllers for controlling remotely operated vehicles.

BACKGROUND

Drone hand controllers, also known as remote controllers, are used for remotely piloting operating remotely operated aircraft, which are commonly referred to as 'drones.' Controllers provide a way for pilots to send commands to the drone, controlling its movement, altitude, and other functions. A typical layout for a drone controller includes two thumb-operated joysticks used to control the drone's movement, such as pitch, roll, yaw, altitude, forward and backward motion, and side-to-side motion, as well as various buttons and switches for a variety of functions, such as taking off and landing, and changing flight modes.

Skillful use of such controllers requires a great deal of coordination by the operator. The piloting of high-performance drones, such as racing drones, requires a particularly high level of skill and fine motor control that allow the user to command sudden drone movements based on millimeter-level thumb movements that generally take a great deal of time and skill to perfect.

SUMMARY

In general, this document describes user input controllers for controlling remotely operated vehicles.

In an example embodiment, a user input device includes a handlebar-shaped housing comprising an elongate central body having a first axial end and a second axial end opposite the first axial end, a first hand grip extending substantially axially away from the elongate central body at the first axial end, a first flexible paddle having a first paddle end affixed to the first hand grip and extending tangentially away from the first hand grip to a second paddle end opposite the first paddle end, a first deflection sensor configured to identify a first amount of deflection of the first flexible paddle, a second hand grip extending substantially axially away from the elongate central body at the second axial end, a second flexible paddle having a third paddle end affixed to the second hand grip and extending tangentially away from the second hand grip to a fourth paddle end opposite the first paddle end, a second deflection sensor configured to identify a second amount of deflection of the second flexible paddle, and circuitry arranged within the elongate central body and having an orientation sensor configured to identify one or more of a pitch, a roll, and a yaw of the elongate central body, and a controller configured to receive an orientation sensor signal from the orientation sensor, a first deflection signal from the first deflection sensor, and a second deflection signal from the second deflection sensor, and provide a control signal based on one or more of the orientation sensor signal, the first deflection signal, and the second deflection signal.

Various embodiments can include some, all, or none of the following features. The handlebar-shaped housing can define a cavity comprising communication circuitry configured to receive the control signal. The user input device can include a first retainer comprising at least a portion of a first loop defining a first opening arranged substantially perpendicular to the first hand grip, and a second retainer comprising at least a portion of a second loop defining a second opening arranged substantially perpendicular to the second hand grip.

In an example implementation, a method for translating user input into control signals includes receiving an orientation sensor signal from an orientation sensor, receiving one or more deflection signals from one or more deflection sensors, determining a control signal based on one or more of the orientation sensor signal and the one or more deflection signals, and providing the control signal at a control signal output port.

Various implementations can include some, all, or none of the following features. The one or more deflection sensors can be configured to identify deflection of one or more flexible paddles relative to an elongate central body. The elongate central body can include a flexible paddle having a first paddle end affixed proximal to an axial end of the elongate central body and extending tangentially away from the axial end to a second paddle end opposite the first paddle end, one or more of the deflection sensors is configured to identify an amount of deflection of the flexible paddle, and the method can include deflecting, by a user, the flexible paddle. The orientation sensor can be configured to identify one or more of a pitch, a roll, and a yaw of an elongate central body. The elongate central body can include a first hand grip extending substantially axially away from the elongate central body at a first axial end and a second hand grip extending substantially axially away from the elongate central body at a second axial end opposite the first axial end, and the method can include moving, by a user in physical contact with at least one of the first hand grip and the second hand grip, the elongate central body. The method can include comprising controlling at least one of pitch, roll, yaw, and throttle of a remotely operated mechanism based on the control signal.

In another example embodiments, a user input device includes a first sensor configured to identify an orientation of a human hand, a second sensor configured to receive a variable input from the human hand, and a controller configured to determine the orientation of the human hand based on a first sensor signal from the first sensor, and determine a variable value based on a second input signal from the second sensor, and provide a control signal based on one or more of the orientation and the variable value.

Various embodiments can include some, all, or none of the following features. The first sensor can be a machine vision sensor having at least one camera configured to capture images of an orientation of the human hand, and wherein the controller can be further configured to determine the orientation based on images captured by the machine vision sensor. The user input device can include a handlebar-shaped housing having an elongate central body having a first axial end and a second axial end opposite the first axial end, a first hand grip extending substantially axially away from the elongate central body at the first axial end, and a second hand grip extending substantially axially away from the elongate central body at the second axial end, wherein the first hand grip or the second hand grip can be configured to be removably affixed to the human hand. The second sensor can be a machine vision sensor comprising at least one camera configured to capture images of an extensile configuration of fingers of the human hand, and wherein the controller can be further configured to determine the variable input based on the images captured by the machine vision sensor.

In another example embodiment, a user input device includes an elongate central body having a first axial end and a second axial end opposite the first axial end, a first end body extending substantially axially away from the elongate central body at the first axial end, a first flexible body extending tangentially away from the first end body, a first deflection sensor configured to identify a first amount of deflection of the first flexible body, and circuitry arranged within the elongate central body and having an orientation sensor configured to identify one or more of a pitch, a roll, and a yaw of the elongate central body, and a controller configured to receive an orientation sensor signal from the orientation sensor, receive a first deflection signal from the first deflection sensor, and provide a control signal based on one or more of the orientation sensor signal and the first deflection signal.

Various embodiments can include some, all, or none of the following features. The user input device can include a second end body extending substantially axially away from the elongate central body at the second axial end, and a second flexible body extending tangentially away from the first end body, and a second deflection sensor configured to identify a second amount of deflection of the second flexible body, wherein the controller can be further configured to receive a second deflection signal from the second deflection sensor, and provide the control signal based on one or more of the orientation sensor signal, the first deflection signal, and the second deflection signal. The elongate central body can define a cavity comprising communication circuitry configured to receive the control signal. The user input device can include a retainer comprising at least a portion of a first loop defining an opening arranged substantially perpendicular to the first end body.

In another example embodiment, a handlebar-shaped drone controller includes a central portion comprising an internal measurement unit for outputting multi-axis data, sensors located at grip positions of the handlebar-shaped drone controller, for outputting sensor position data, a processor for generating instructions based on the multi-axis data and the sensor position data, and an interface for communicating the instructions to a drone.

Various embodiments can include some, all, or none of the following features. The handlebar-shaped drone controller can include a first retainer having a first hand grip at a first grip position, and at least a portion of a first loop defining a first opening arranged substantially perpendicular to the first hand grip, and a second retainer having a second hand grip at a second grip position, and at least a portion of a second loop defining a second opening arranged substantially perpendicular to the second hand grip. One or more of the sensors can be deflection sensors configured to identify deflection of one or more flexible paddles relative to the central portion.

The systems and techniques described here may provide one or more of the following advantages. First, a system can provide a user input device having a familiar form factor. Second, the system can make the operation of remotely operated vehicles (ROVs) easier and more intuitive. Third, the system can reduce the learning curve for new ROV operators. Fourth, the system can make the operation of ROVs safer and less prone to operator error. Fifth, the system can allow ROVs to move and/or respond more quickly and/or precisely to user input. Sixth, the system can enable ROVs to perform new maneuvers that were previously impractical, difficult, or impossible to perform. Sixth, the system improves the precision of ROVs for slow flight and for maintaining fixed positions.

The details of one or more implementations are set forth in the accompanying drawings and the description below. Other features and advantages will be apparent from the description and drawings, and from the claims.

DETAILED DESCRIPTION

Existing drone controllers typically use a twin joystick arrangement, in which a user controls the operation of the drone through fine coordinated movements of both thumbs. Many new users find this arrangement to be unintuitive, and new users can require a significant amount of time to become skillful or even merely confident in their operational skills. For similar reasons, drones and similarly operated vehicles may operate slowly and/or imprecisely. Drones generally have limited flight times, so slow and/or imprecise movements can reduce the operational usefulness of drones in such situations (e.g., less work getting done, drone races being lost). Slow and/or imprecise operation can also result in damage or loss of a drone (e.g., crashing). However, many people are already very accustomed to the use of handlebars (e.g., a straight or bent bar with a hand grip at each end), as they have likely used them throughout their lives as control devices for familiar mechanisms such as bicycles, motorcycles, video games, and ride-on toys.

In general, the document describes handlebar-shaped user input controllers for controlling remotely operated vehicles and remotely operated mechanisms such as drones. A user can grip one or both ends of a generally oblong, ovular, or polygonal tubular object having a width that approximates a width between human shoulders or outstretched hands, with a grip at each end having a shape or diameter that is complimentary to size and grip of typical human hands, and at least one throttle input that can be operated by movement of the user's fingers.

Figure 1A:
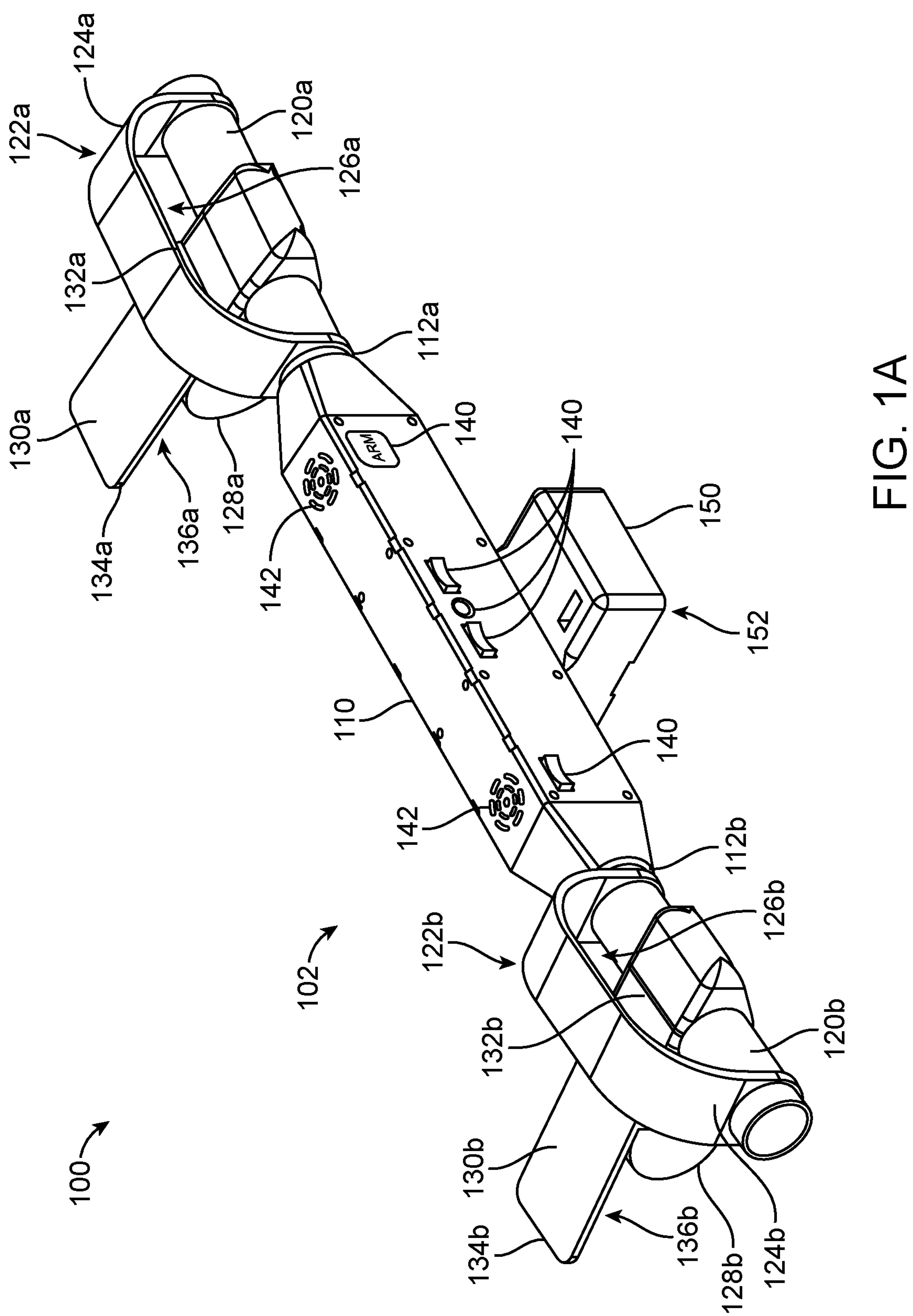
FIGS. 1A-1D are various views of an example user input device.
Figure 1B:
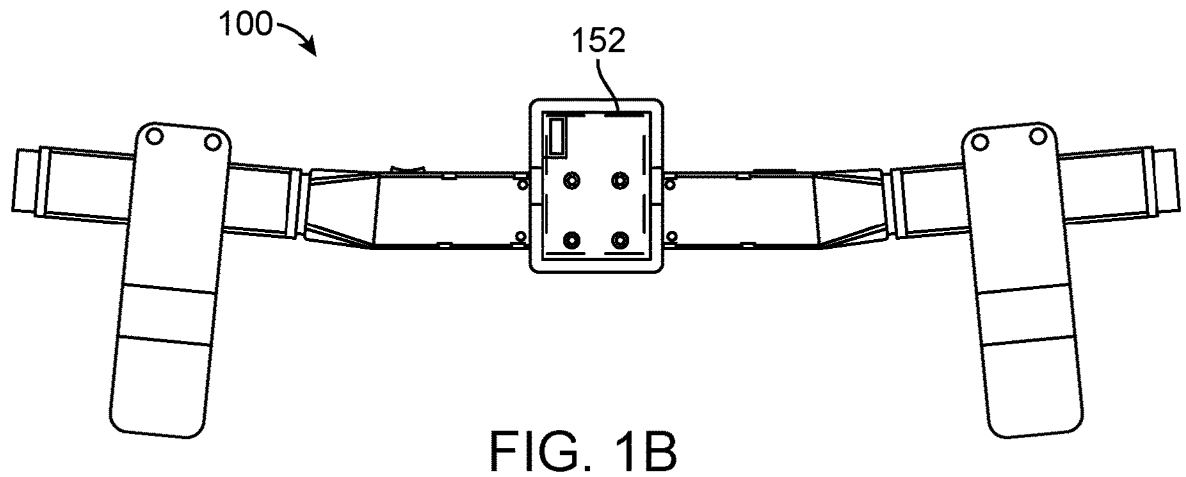
Figure 1C:
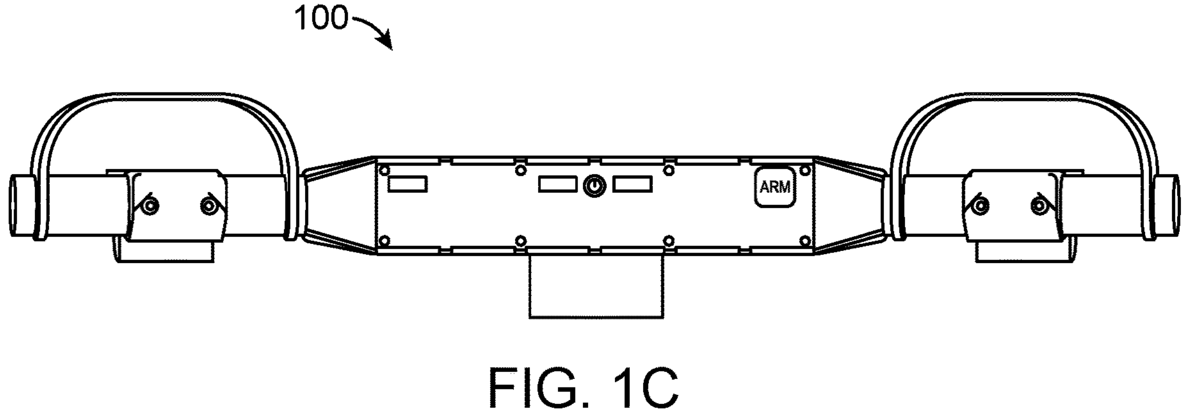
Figure 1D:
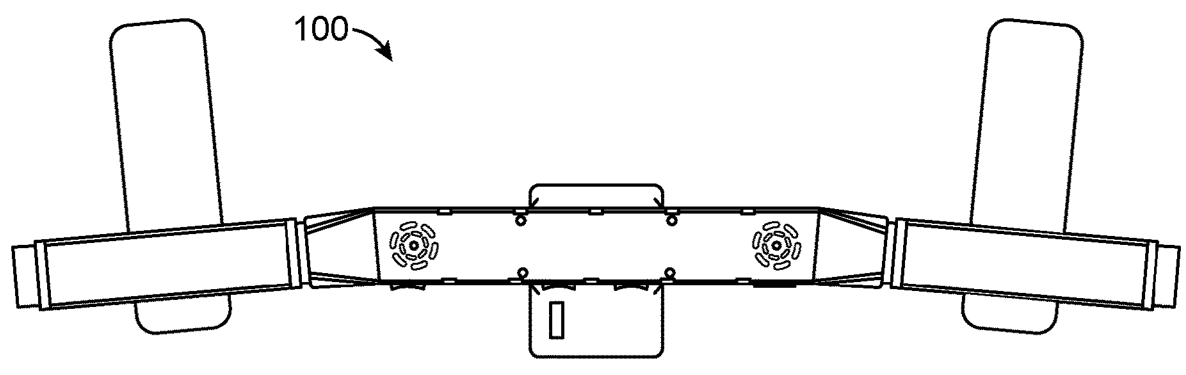

FIGS. 1A-1D are various views of an example input device 100. Referring primarily to FIG. 1A, the input device 100 includes a handlebar-shaped housing 102 having an elongate central body 110 having an axial end 112*a* and an axial end 112*b* opposite the axial end 112*a*.

A hand grip 120*a* extends substantially axially away from the elongate central body 110 at the axial end 112*a* and provides a grip position for a user's hand. A flexible paddle 130*a* having a paddle end 132*a* affixed to the hand grip 120*a* and extending tangentially away from the hand grip 120*a* to a paddle end 134*a* opposite the paddle end 132*a* and provides a grip position for the user's other hand.

Another hand grip 120*b* extends substantially axially away from the elongate central body 110 at the axial end 112*b*. A flexible paddle 130*b* having a paddle end 132*b* affixed to the hand grip 120*b* and extending tangentially away from the hand grip 120*b* to a paddle end 134*b* opposite the paddle end 132*b*.

The hand grip 120*a* includes a hand strap 122*a*. The hand strap 122*a* is configured as a hand retainer having at least a portion of a loop 124*a* defining an opening 126*a* arranged substantially perpendicular to the hand grip 120*a*. The hand grip 120*b* includes a hand strap 122*b*. The hand strap 122*b* is configured as a hand retainer having at least a portion of a loop 124*b* defining an opening 126*b* arranged substantially perpendicular to the hand grip 120*b*.

Figure 8:
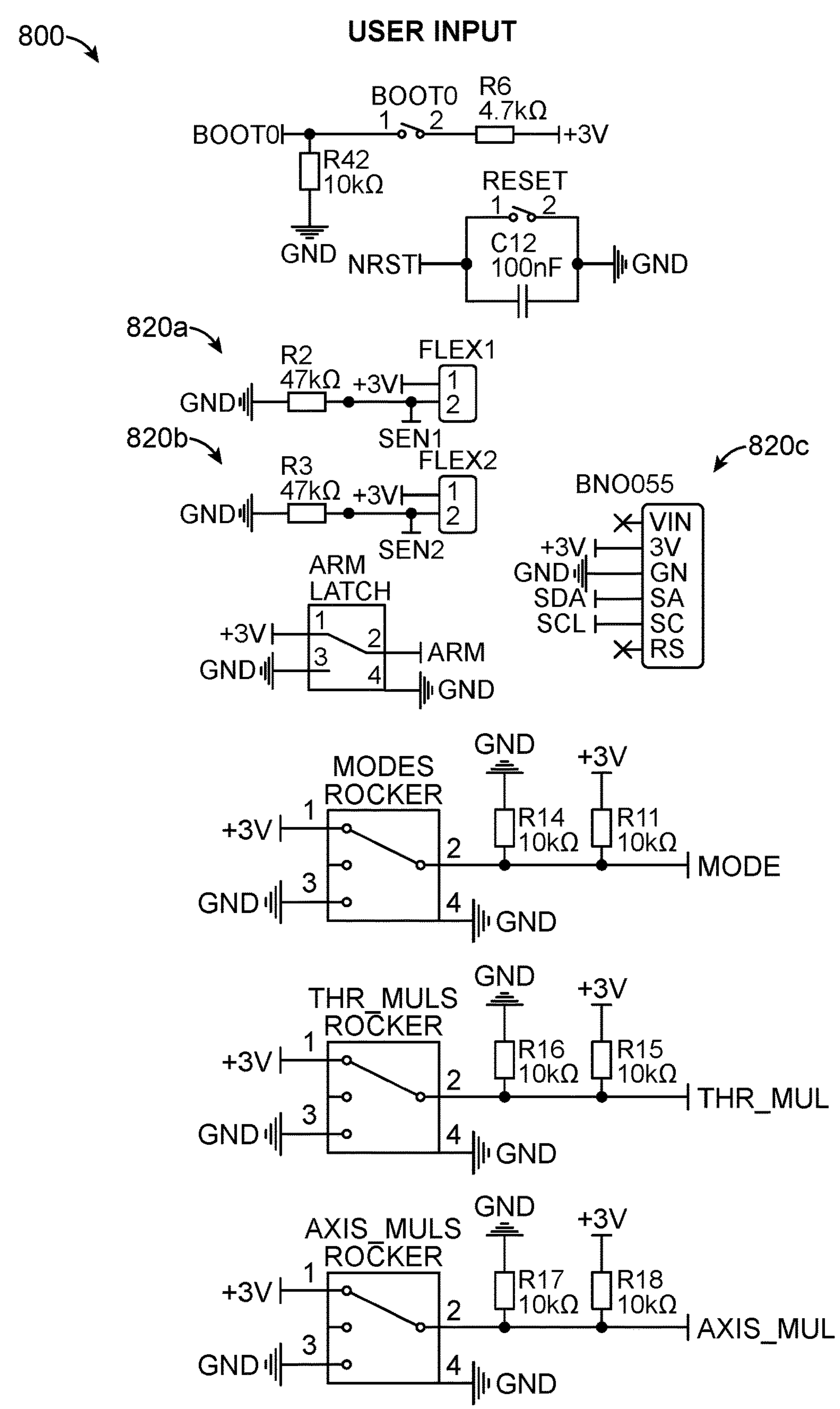

The flexible paddle 130*a* is a flexible body that includes a deflection sensor 136*a* (not directly visible but shown in schematic form as an example deflection circuit 820*a* in FIG. 8) configured to identify and provide a deflection signal as representative of a variable value of an amount of deflection of the flexible paddle 130*a*. The flexible paddle 130*b* is a flexible body that includes a deflection sensor 136*b* (not directly visible but shown in schematic form as an example circuit 820*b* in FIG. 8) configured to identify and provide a deflection signal representative of a variable value of an amount of deflection of the flexible paddle 130*b*.

The elongate central body 110 includes a collection of user inputs 140 (e.g., buttons, switches). In some embodiments, the user inputs 140 can be configured to control various operations of the remotely operated vehicle, such as flight modes, takeoff and landing, arming and disarming the vehicle, controlling power to the input device 100 or the vehicle, and/or combinations of these and any other appropriate vehicle control inputs. In some embodiments, some or all of the user inputs 140 may be user-mappable to user-selected features and operations.

The elongate central body 110 also includes a pair of speakers 142. In some embodiments, the speakers 142 can be configured to provide audible feedback to the user. For example, the speakers 142 can emit warning or proximity alerts, spoken alerts (e.g., malfunction alerts, remaining battery power updates), or combinations of these and any other appropriate audible feedback. In some embodiments, the speakers 142 can emit tones that are representative of an orientation of the input device 100 or a remotely operated vehicle (e.g., one or more tones that can change in pitch or volume based on the pitch, roll, and/or yaw of the controller or the vehicle).

The elongate central body 110 defines a central cavity (not shown) in which controller circuitry is arranged. Examples of such controller circuitry is discussed in the descriptions of FIGS. 4-13. For example, the central cavity can hold a controller, sensors, input/output circuits, and one or more batteries for powering the input device 100. The sensors include one or more orientation sensors, such as the orientation sensor circuit 820*c* of FIG. 8, configured to sense changes to one or more of a pitch, roll, or heading (e.g., yaw) of the elongate body of the input device 100 (e.g., relative to an initial starting position, relative to gravity, relative to the Earth's magnetic field) and provide them to a controller configured to receive the orientation sensor signal from the orientation sensor and the deflection signals from the deflection sensors, and provide a control signal based on one or more of the orientation sensor signal and the deflection signals. In some embodiments, the controller is configured to interpret the orientation sensor signals and the deflection sensor signals and transform them into control commands for a remotely operated vehicle. For example, one or more of the example circuits of FIGS. 4-13 can be arranged within the central cavity.

A compartment 150 is configured to retain an interface module 152. In general, various vehicle platforms can implement various different communication systems. The compartment 150 is configured to receive the controller transceiver interfaces of such communication systems and electrically connect the interfaces to the internal controller circuitry of the input device 100, so the interface can receive control signals and commands from the input device 100 and transmit them to a remotely operated vehicle.

In some embodiments, the input device 100 can include an interface module arranged within the central cavity, in addition to or in place of the interface module 152 in the compartment 150. For example, a processor of the input device 100 can be configured to perform at least some functions otherwise performed by a separate interface module (e.g., protocol conversion, frequency hopping). In some embodiments, one or more processors may be communicatively coupled to the circuitry of the input device 100. For example, a processor can be used to manage the radio frequency signal transmission. In an example of such an arrangement, this circuit can end up having logic similar to the arrangement described above, with an additional, alternate radio circuit inside the device (e.g., a primary processor can have bidirectional communications with a second processor that drives a transceiver).

In some embodiments, all, some, or none of the input device 100 can be formed from carbon fiber. For example, the flexible paddles 130*a* and 130*b* can be reinforced with lightweight carbon fiber to add strength while promoting flexibility.

In use, an operator would grip the input device 100 by inserting his or her hands through the loops 124*a* and 124*b* such that their palms contact the hand grips 120*a* and 120*b*, similar to placing their hands on a set of bicycle handlebars. The user can wrap one or more fingers about the hand grips 120*a* and 120*b*, and/or the user's hands are retained in contact with the hand grips 120*a* and 120*b* by the loops 124*a* and 124*b* (e.g., so the user can open his or her hands without dropping the input device 100).

Directional input can be performed by pivoting, rotating, and/or tilting the input device 100 about its X, Y, and Z axes. For example, by turning the input device 100 in a horizontal plane, similar to steering a bicycle, a user can control a remotely operated vehicle to change its heading relative to the Earth's magnetic field. In another example, the user can control the vehicle to increase or decrease its pitch, relative to its own orientation, by rotating or pitching the input device 100 up and down, and the user can cause the vehicle to roll clockwise or counterclockwise, relative to its own orientation, by rotating the input device like a steering wheel. In another example, the user may apply any arbitrary, simultaneous rotation of two or more axes to the input device 100 to cause the vehicle to rotate its orientation based on the same two or more axes simultaneously, in close correspondence to said user inputs.

Speed and/or altitude input can be performed by bending the flexible paddles 130*a* and/or 130*b*. With the user's hands inserted in the loops 124*a* and 124*b* with their fingers outstretched, the flexible paddles 130*a* and 130*b* can remain in a flat, neutral position. The user can bend the flexible paddles 130*a* and 130*b* by bending their fingers, and the amount of deflection can be sensed by the deflection sensors 136*a* and 136*b*. In some implementations, the amount of flexure can be varied and interpreted by the controller at an analog input that can be used for throttle, speed, or any other appropriate analog control of the remotely operated vehicle.

Figures 2, 3:
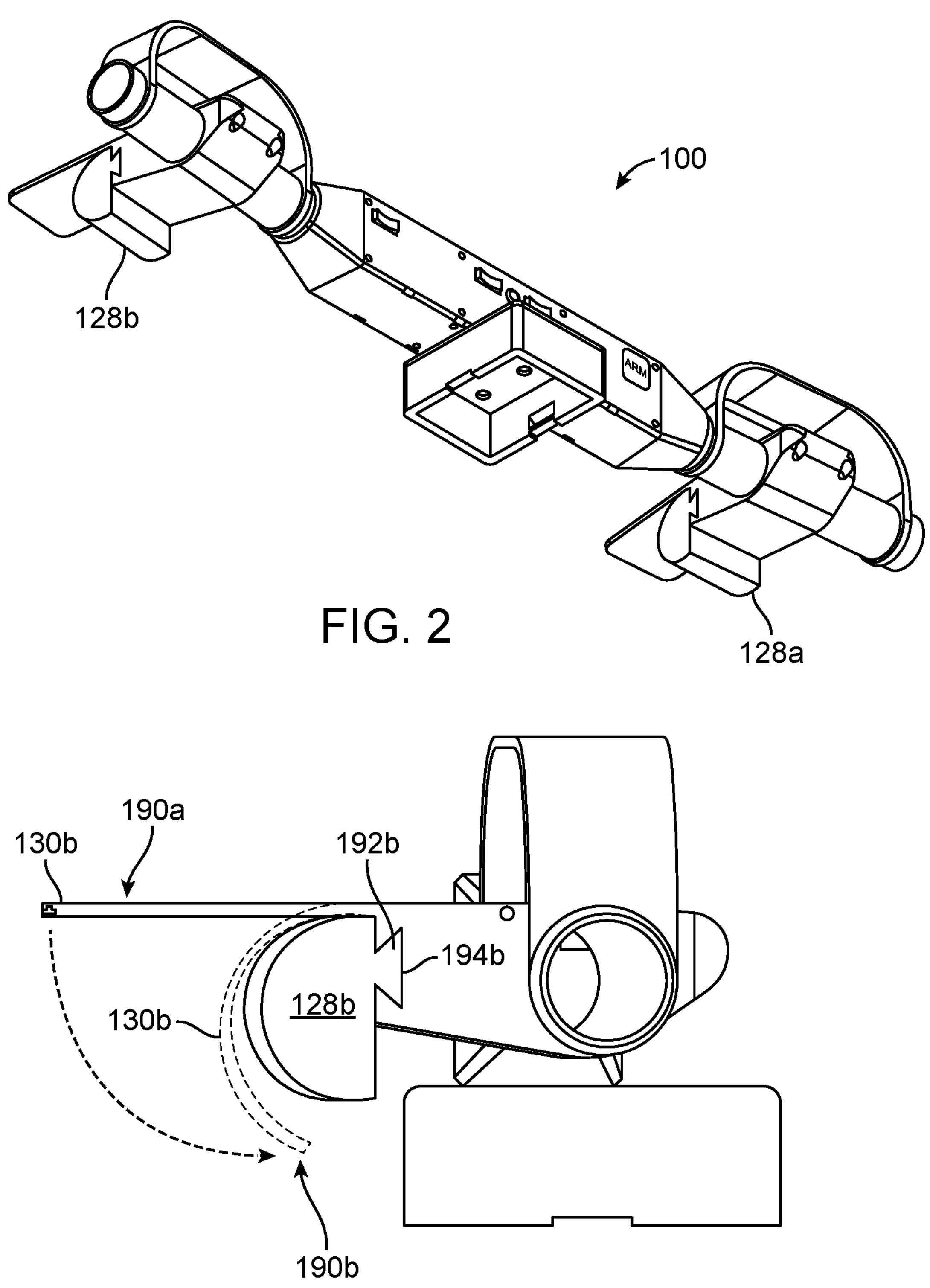
FIGS. 2 and 3 are additional views of an example user input device.

Referring primarily to FIGS. 2 and 3, the hand grips 120*a* and 120*b* include a hand adapter 128*a* and a hand adapter 128*b*. The hand adapters 128*a* and 128*b* are semi-cylindrical (e.g., half-cylinder) bodies arranged substantially parallel to the hand grips 120*a* and 120*b* proximal to the paddle ends 132*a* and 132*b*.

Referring now primarily to FIG. 3, the flexible paddles are configured to contact a sidewall of the semi-cylindrical body during flexure of the first flexible paddle. In the illustrated example, the flexible paddle 130*b* is shown in a neutral configuration 190*a* in which the flexible paddle 130*b* is in a substantially neutral, undeflected position. As the user bends his or her fingers, the flexible paddle 130*b* will bend or curl, for example to a deflected configuration 190*b*. The hand adapter 128*b* provides a guide or backstop for the flexure of the flexible paddle 130*b*. In some embodiments, the hand adapter 128*b* (and the hand adapter 128*a*) can function as a mechanical limit on the analog input (e.g., a throttle limiter). In some embodiments, the hand adapters 128*a* and 128*b* can protect the flexible paddles 130*a* and 130*b* from damage due to sharp, excessive bending or folding.

In some embodiments, the hand adapters 128*a* and 128*b* can be interchangeable. In the illustrated example, the semi-cylindrical body is removably affixed to the hand grip by a dovetail 192*b* configured to mate with and be retained by a complimentary recess 194*b*. Different hand adapters having different shapes, sizes, or radiuses can be removably interchanged with the hand adapters 128*a* and 128*b*. In some embodiments, the hand adapters 128*a* and 128*b* can be interchanged to customize the input device to different users having different hand and/or finger sizes and compliment the natural grip of the user (e.g., bigger sizes for bigger hands, smaller sizes for smaller hands). In some embodiments, the hand adapters 128*a* and 128*b* can be interchanged to change a mechanical limiting effect on user input (e.g., bigger sizes to limit flex and an amount of input, smaller sizes to permit a greater range of flexibility and higher levels of input).

Figures 4, 5:
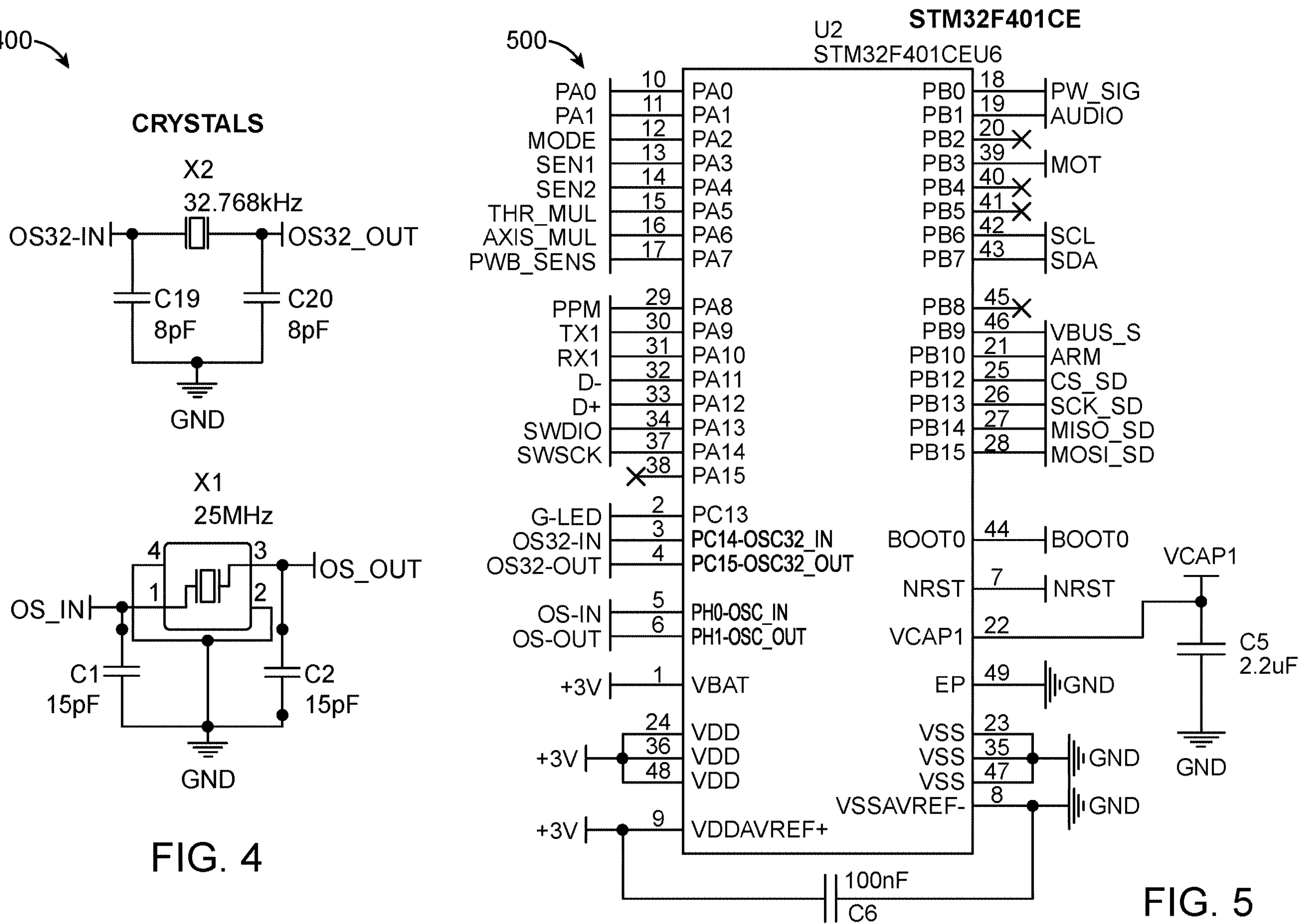
FIGS. 4-13 are schematic diagrams of various circuits of the example user input device.
Figures 6, 7:
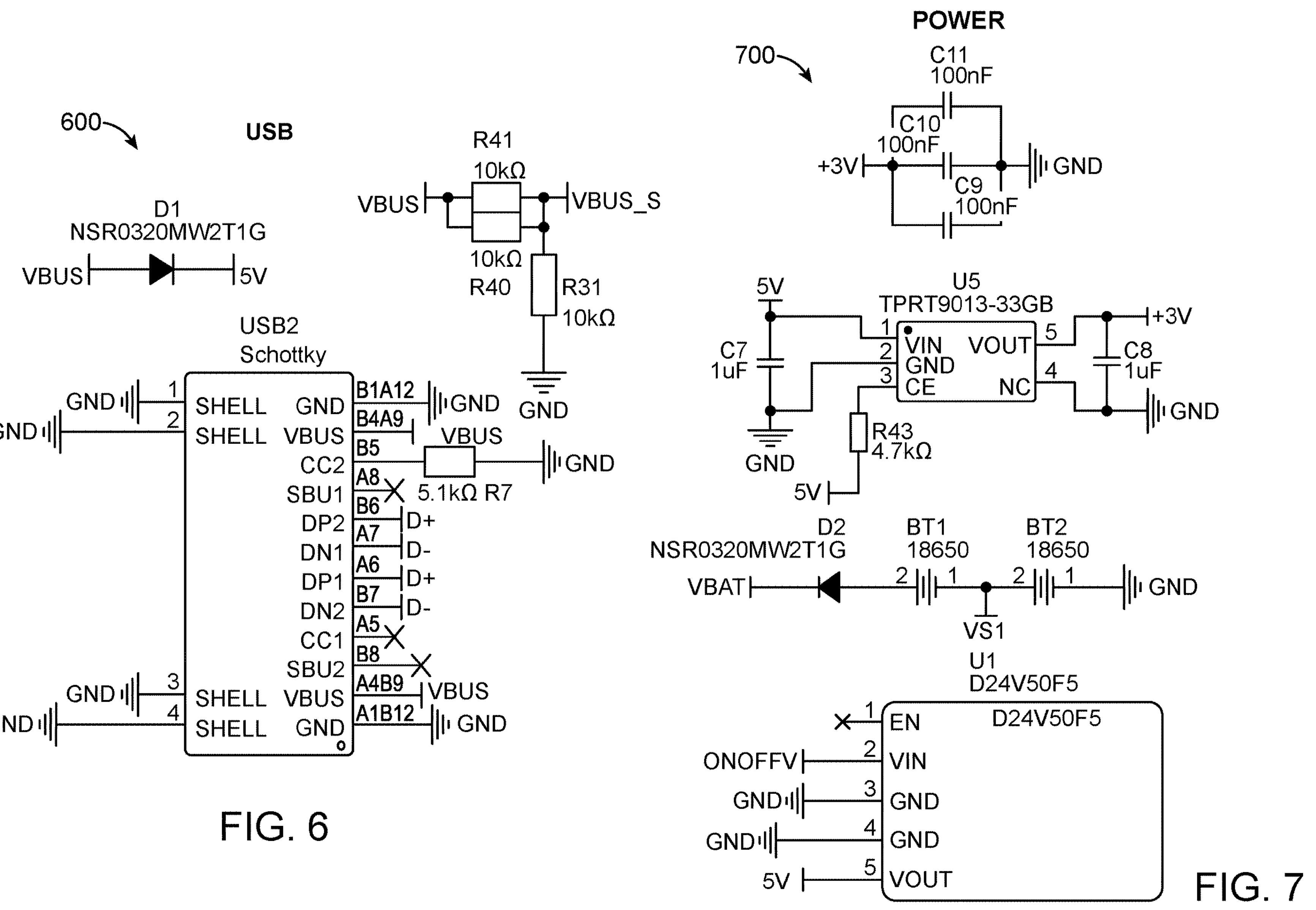

FIGS. 4-13 are schematic diagrams of various circuits of the example input device 100. FIG. 4 shows an example crystal timer circuit 400. FIG. 5 shows an example controller circuit 500. FIG. 6 shows an example universal serial bus (USB) controller circuit 600. FIG. 7 shows several example power circuits 700. FIG. 8 shows an example user input circuit 800, including the orientation sensor circuit 820*c*. In some embodiments, the orientation sensor circuit 820*c* can provide feedback such as absolute orientation (e.g., Euler vector, 100 Hz), three axis orientation data based on a 360° sphere, absolute orientation (e.g., quaternion, 100 Hz), four point quaternion output (e.g., for more accurate data manipulation), angular velocity vector (100 Hz), three axes of rotation speed (e.g., in rad/s), acceleration vector (100 Hz), three axes of acceleration (e.g., gravity and linear motion in m/s^2), magnetic field strength vector (20 Hz), three axis of magnetic field sensing (e.g., in micro Tesla (uT)), linear acceleration vector (100 Hz), three axes of linear acceleration data (e.g., acceleration minus gravity in m/s^2), gravity vector (100 Hz), three axis of gravitational acceleration (e.g., minus any movement, in m/s^2), temperature (1 Hz), and/or ambient temperature (e.g., in degrees Celsius). In some embodiments, the orientation sensor circuit 820*c* can be a BNO055 nine-axis absolute orientation sensor.

Figure 9:
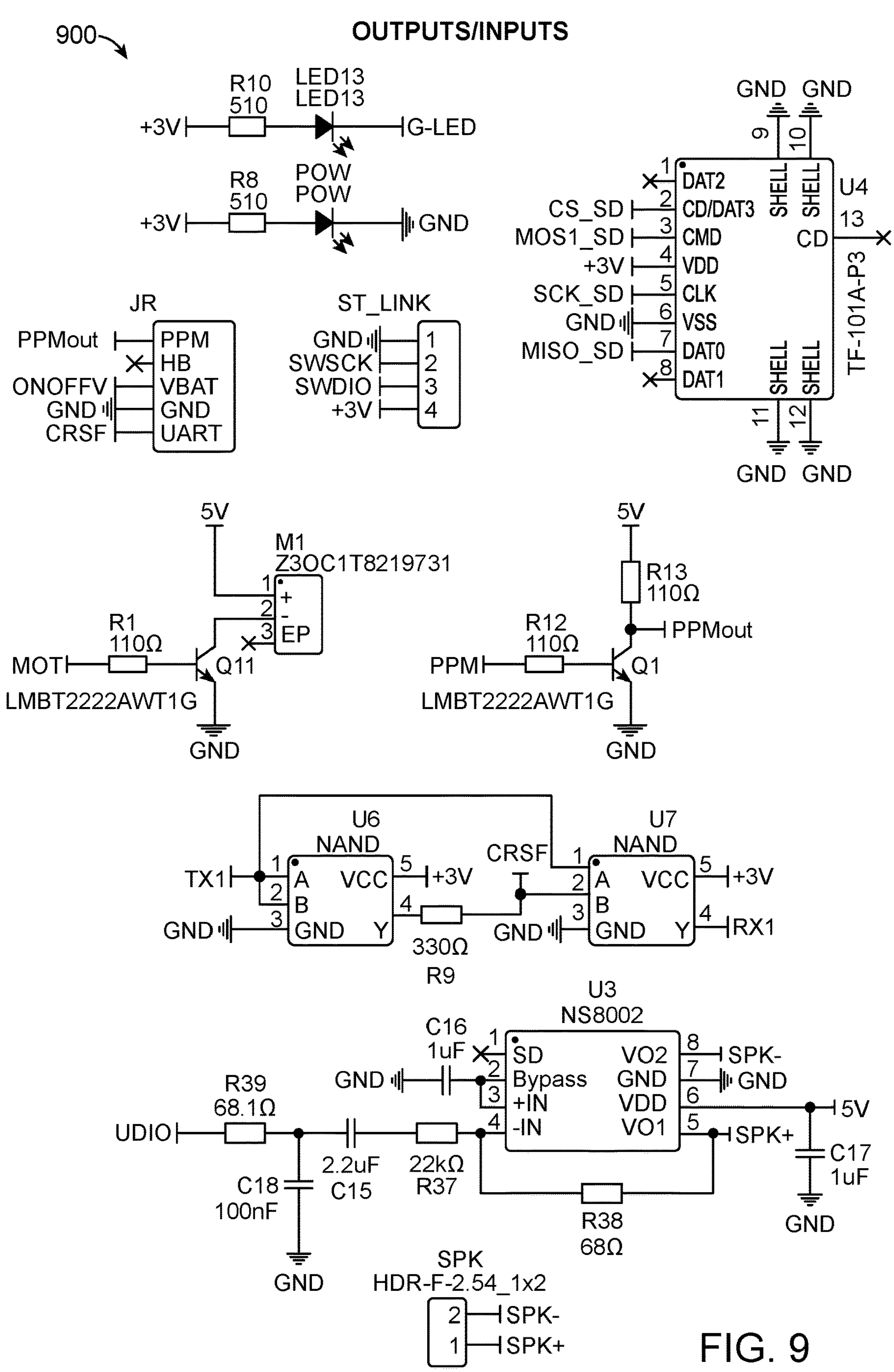
Figure 10:
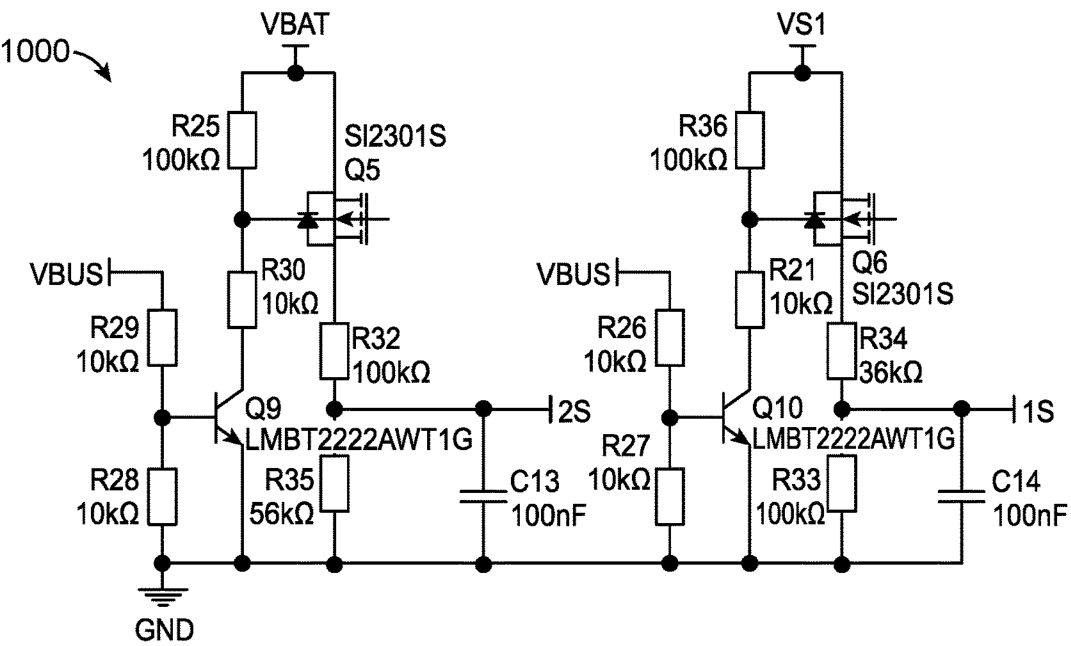
Figure 11:
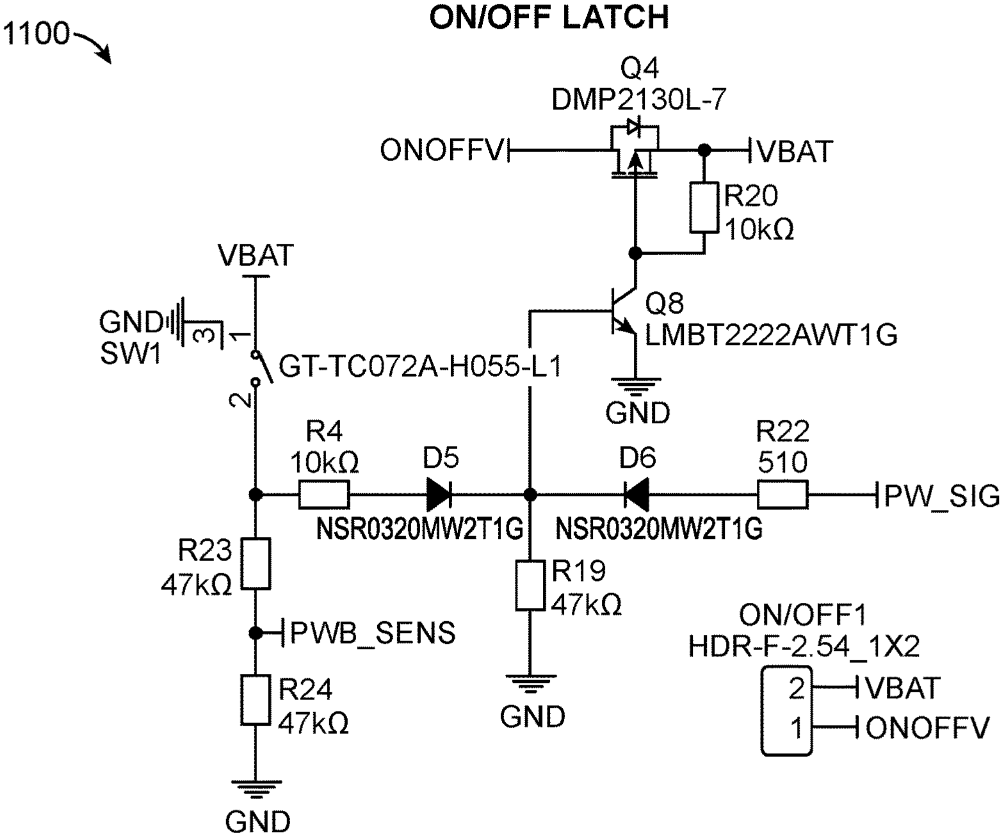
Figure 12:
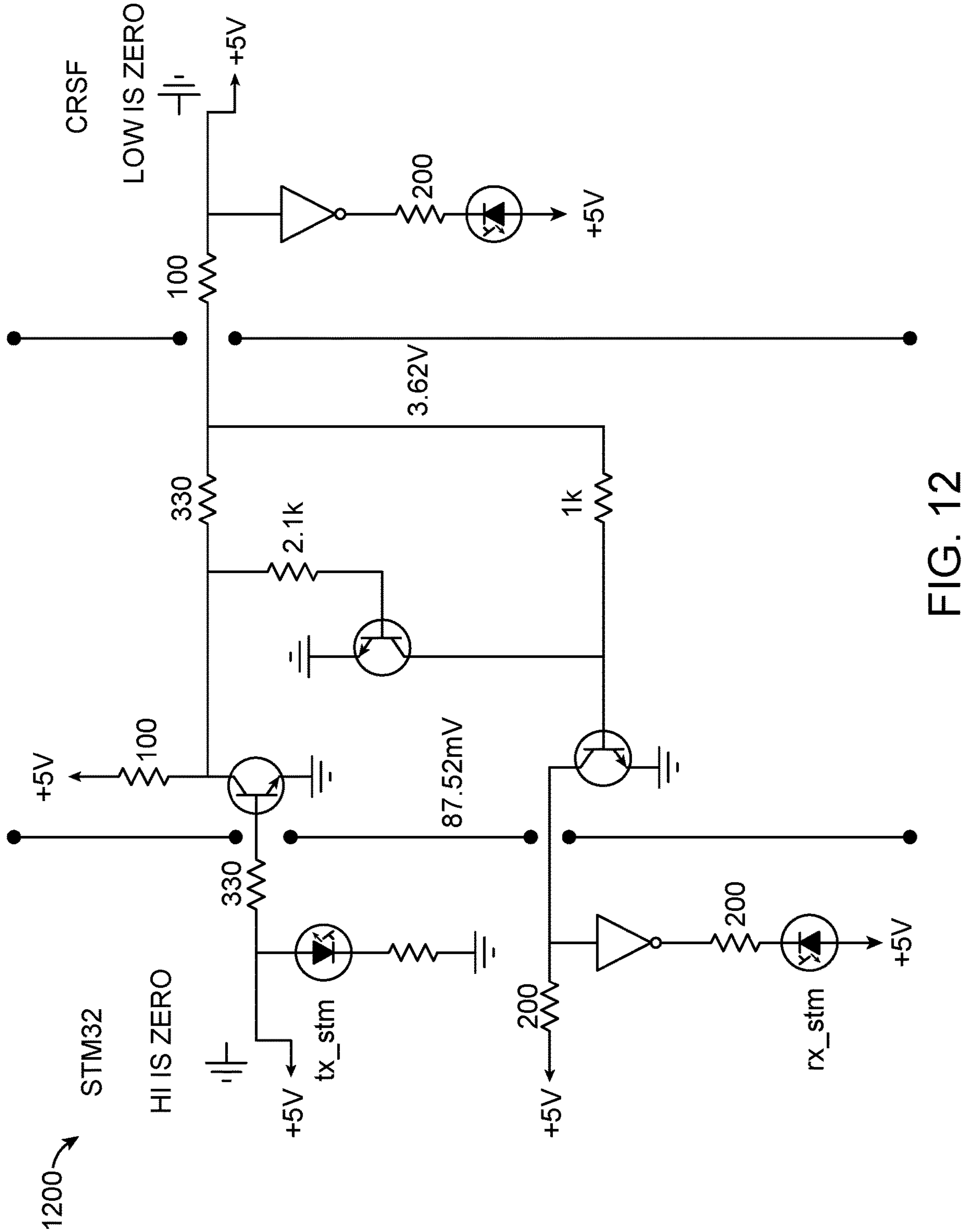
Figure 13:
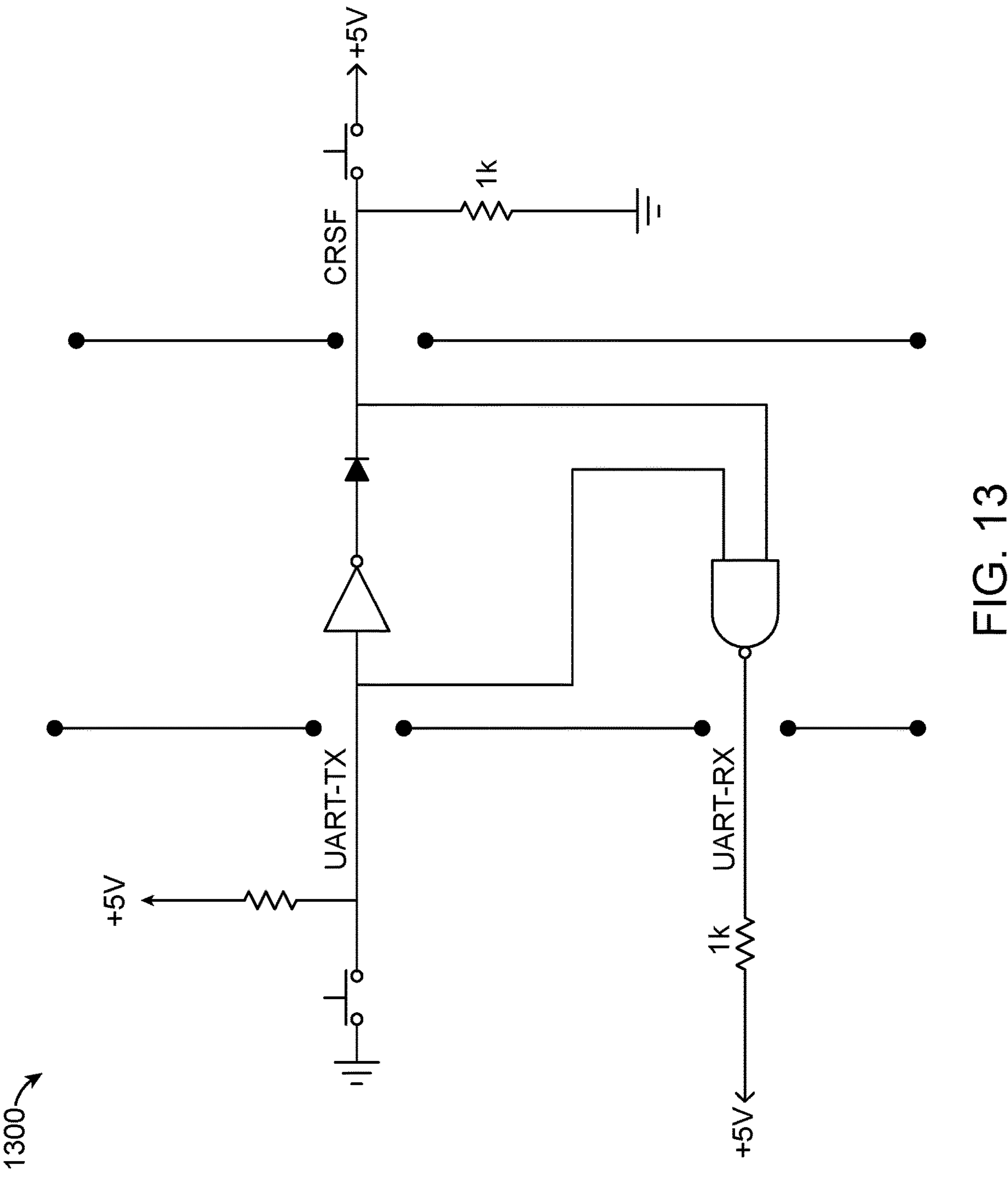

FIG. 9 shows several example input/output circuits 900. FIG. 10 shows an example charging circuit 1000. FIG. 11 shows an example on/off circuit 1100. FIGS. 12 and 13 show example TTL logic adapter circuits 1200 and 1300.

Figure 14A:
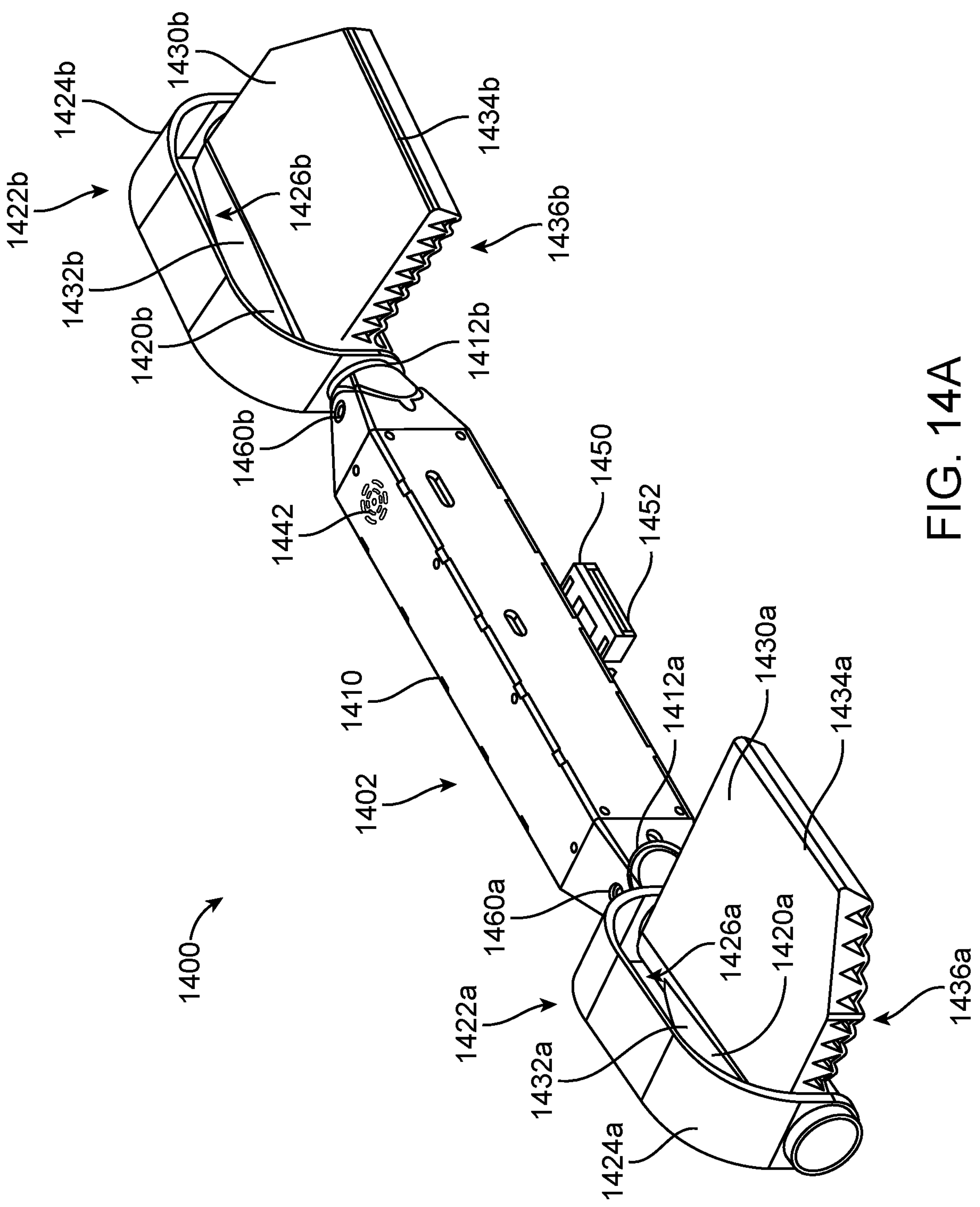
FIGS. 14A-14E are various views of another example user input device.

FIGS. 14A-14E are various views of an example input device 1400. In general, the input device 1400 is substantially similar to the example input device 100 of FIGS. 1A-1D with different embodiments of the hand grips 120*a* and 120*b*. Referring primarily to FIG. 14A, the input device 1400 includes a handlebar-shaped housing 1402 having an elongate central body 1410 having an axial end 1412*a* and an axial end 1412*b* opposite the axial end 112*a*.

A hand grip 1420*a* is flexibly affixed to the elongate central body 1410 by a joint 1460*a* and extends substantially axially away from the elongate central body 1410 at the axial end 1412*a*. A flexible paddle 1430*a* having a paddle end 1432*a* affixed to the hand grip 1420*a* and extending tangentially away from the hand grip 1420*a* to a paddle end 1434*a* opposite the paddle end 1432*a*.

Another hand grip 1420*b* is flexibly affixed to the elongate central body 1410 by a joint 1460*a* and extends substantially axially away from the elongate central body 1410 at the axial end 1412*b*. A flexible paddle 1430*b* having a paddle end 1432*b* affixed to the hand grip 1420*b* and extending tangentially away from the hand grip 1420*b* to a paddle end 1434*b* opposite the paddle end 1432*b*.

The hand grip 1420*a* includes a hand strap 1422*a*. The hand strap 1422*a* is configured as a hand retainer having at least a portion of a loop 1424*a* defining an opening 1426*a* arranged substantially perpendicular to the hand grip 1420*a*. The hand grip 1420*b* includes a hand strap 1422*b*. The hand strap 1422*b* is configured as a hand retainer having at least a portion of a loop 1424*b* defining an opening 1426*b* arranged substantially perpendicular to the hand grip 1420*b*.

Figure 24:
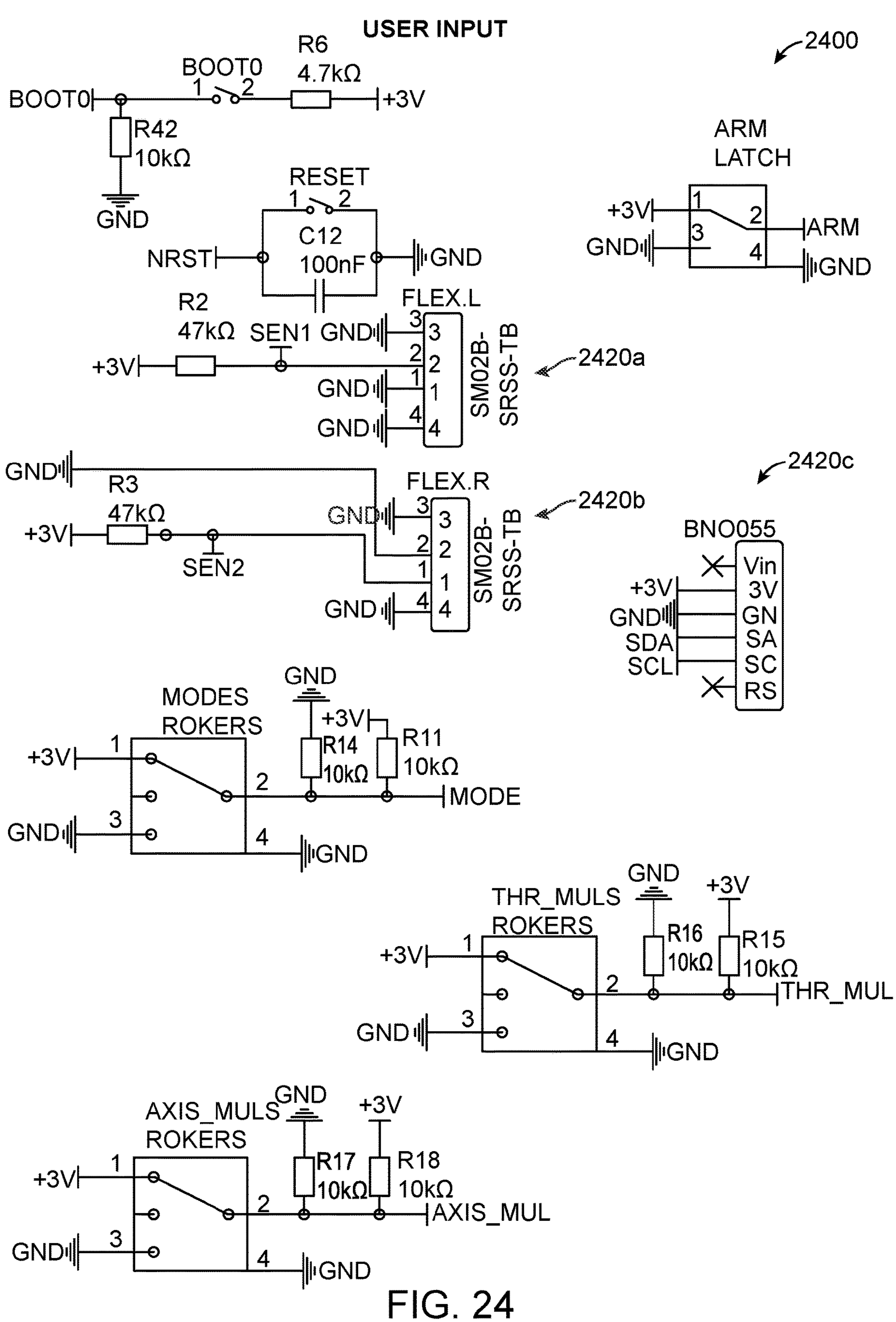

The flexible paddle 1430*a* is a flexible body that includes a deflection sensor 1436*a* (not directly visible but shown in schematic form as an example deflection circuit 2420*a* in FIG. 24) configured to identify and provide a deflection signal representative of an amount of deflection of the flexible paddle 1430*a*. The flexible paddle 1430*b* is a flexible body that includes a deflection sensor 1436*b* (not directly visible but shown in schematic form as an example deflection circuit 2420*b* in FIG. 24) configured to identify and provide a deflection signal representative of an amount of deflection of the flexible paddle 1430*b*.

Figures 14B, 14C, 14D, 14E:
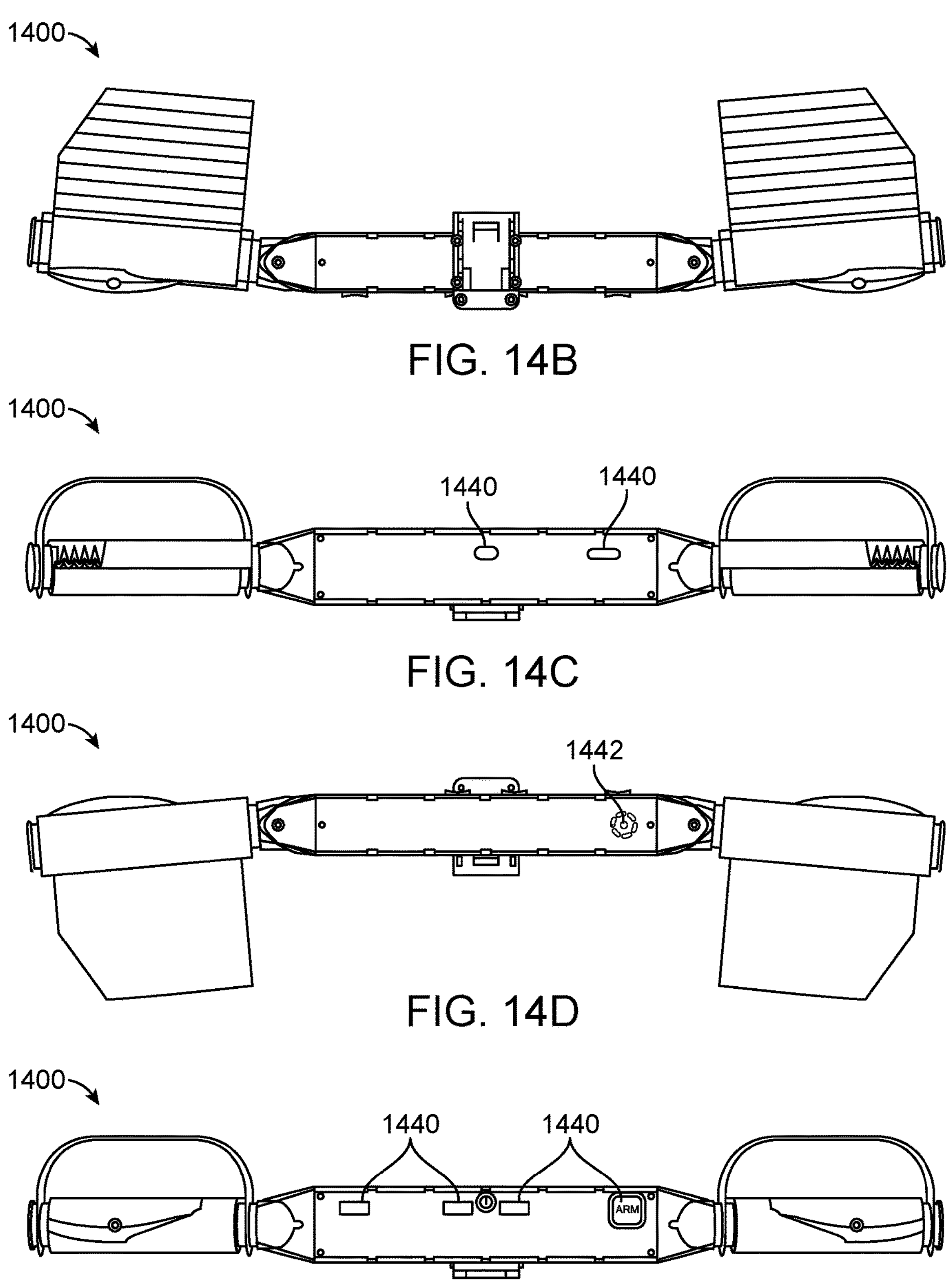

The elongate central body 1410 includes a collection of user inputs 1440 (e.g., buttons, switches). For example, as shown in FIG. 14C, the user inputs 1440 can be a USB cable port and/or an SD card port. In some embodiments, the user inputs 1440 can be configured to control various operations of the remotely operated vehicle, such as flight modes, takeoff and landing, arming and disarming the vehicle, controlling power to the input device 1400 or the vehicle, and/or combinations of these and any other appropriate vehicle control inputs. In some embodiments, some or all of the user inputs 1440 may be user-mappable to user-selected features and operations.

The elongate central body 1410 also includes a pair of speakers 1442. In some embodiments, the speakers 1442 can be configured to provide audible feedback to the user. For example, the speakers 1442 can emit warning or proximity alerts, spoken alerts (e.g., malfunction alerts, remaining battery power updates), or combinations of these and any other appropriate audible feedback. In some embodiments, the speakers 1442 can emit tones that are representative of an orientation of the input device 1400 or a remotely operated vehicle (e.g., one or more tones that can change in pitch or volume based on the pitch, roll, and/or yaw of the controller or the vehicle).

The elongate central body 1410 defines a central cavity (not shown) in which controller circuitry is arranged. Examples of such controller circuitry is discussed in the descriptions of FIGS. 20-29. For example, the central cavity can hold a controller, sensors, input/output circuits, communication circuitry, and one or more batteries for powering the input device 1400. The sensors include one or more orientation sensors, such as the orientation sensor circuit 2420*c* of FIG. 24, configured to sense changes to one or more of a pitch, roll, or heading (e.g., yaw) of the elongate body of the input device 1400 (e.g., relative to an initial starting position, relative to gravity, relative to the Earth's magnetic field) and provide them to a controller configured to receive the orientation sensor signal from the orientation sensor and the deflection signals from the deflection sensors, and provide a control signal based on one or more of the orientation sensor signal and the deflection signals. In some embodiments, the controller is configured to interpret the orientation sensor signals and the deflection sensor signals and transform them into control commands for a remotely operated vehicle. For example, one or more of the example circuits of FIGS. 20-29 can be arranged within the central cavity.

A compartment 1450 is configured to retain an interface module 1452. In general, various vehicle platforms can implement various different communication systems. The compartment 1450 is configured to receive unidirectional or bidirectional controller transceiver interfaces of such communication systems and electrically connect the interfaces to the internal controller circuitry of the input device 1400, so the interface can receive control signals and commands from the input device 1400 and transmit them to a remotely operated vehicle.

In some embodiments, the input device 1400 can include an interface module arranged within the central cavity, in addition to or in place of an interface module 1452 in the compartment 1450. For example, a processor of the input device 1400 can be configured to perform at least some functions otherwise performed by a separate interface module (e.g., protocol conversion, frequency hopping). In some embodiments, one or more processors may be communicatively coupled to the circuitry of the input device 1400. For example, a processor can be used to manage the radio frequency signal transmission. In an example of such an arrangement, this circuit can end up having logic similar to the arrangement described above, with an additional, alternate radio circuit inside the device (e.g., a primary processor can have bidirectional communications with a second processor that drives a transceiver).

In some embodiments, all, some, or none of the input device 1400 can be formed from carbon fiber. For example, the flexible paddles 1430*a* and 1430*b* can be reinforced with lightweight carbon fiber to add strength while promoting flexibility.

In use, an operator would grip the input device 1400 by inserting his or her hands through the loops 1424*a* and 1424*b* such that their palms contact the hand grips 1420*a* and 1420*b*, similar to placing their hands on a set of bicycle handlebars. The user can wrap one or more fingers about the hand grips 1420*a* and 1420*b*, and/or the user's hands are retained in contact with the hand grips 1420*a* and 1420*b* by the loops 1424*a* and 1424*b* (e.g., so the user can open his or her hands without dropping the input device 1400).

Directional input can be performed by pivoting, rotating, and/or tilting the input device 1400 about its X, Y, and Z axes. For example, by turning the input device 1400 in a horizontal plane, similar to steering a bicycle, a user can control a remotely operated vehicle to change its heading relative to the Earth's magnetic field. In another example, the user can control the vehicle to increase or decrease its pitch, relative to its own orientation, by rotating or pitching the input device 1400 up and down, and the user can cause the vehicle to roll clockwise or counterclockwise, relative to its own orientation, by rotating the input device like a steering wheel. In another example, the user may apply any arbitrary, simultaneous rotation of two or more axes to the input device 1400 to cause the vehicle to rotate its orientation based on the same two or more axes simultaneously, in close correspondence to said user inputs.

Figure 15:
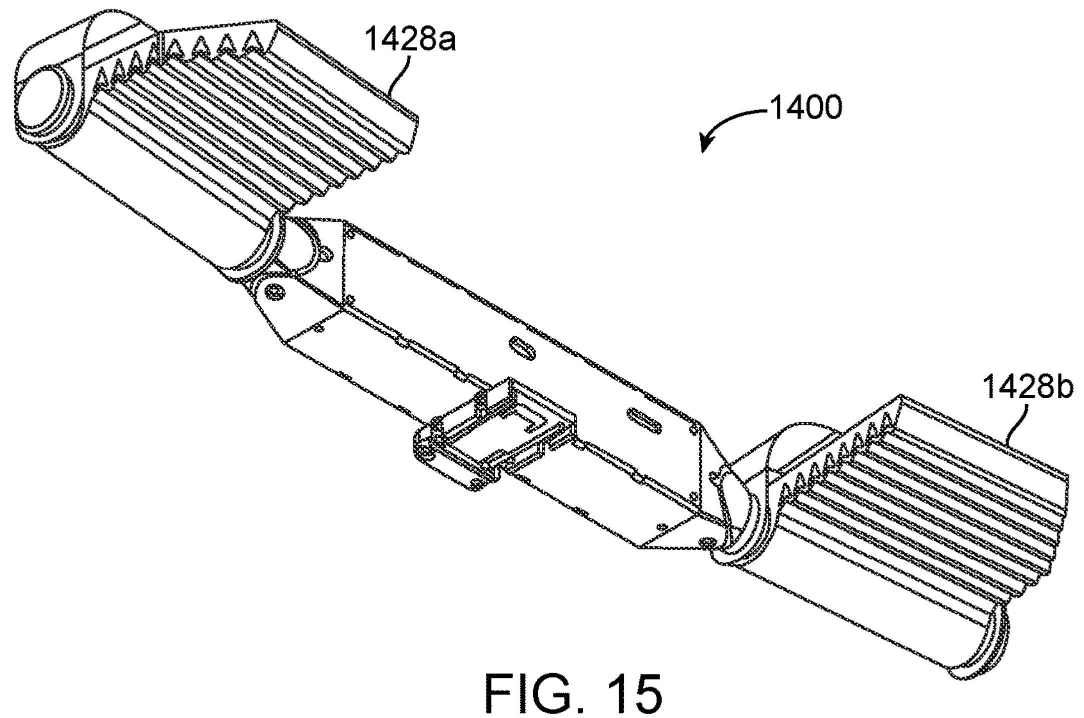
FIGS. 15 and 16 are additional views of another example user input device.
Figure 16:
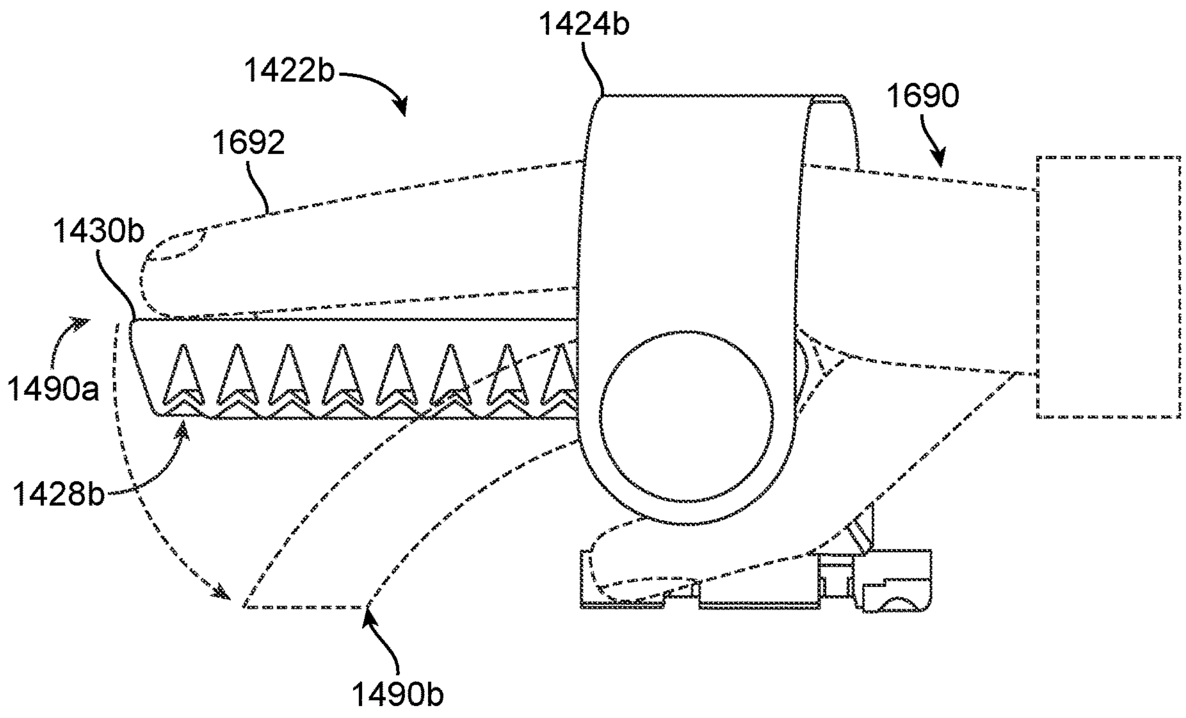

Referring primarily to FIGS. 15 and 16, speed and/or altitude input can be performed by bending the flexible paddles 1430*a* and/or 1430*b*. With the user's hands 1690 inserted in the loops 1424*a* and 1424*b* with their fingers 1692 outstretched, the flexible paddles 1430*a* and 1430*b* can remain in a flat, neutral position. The user can bend the flexible paddles 1430*a* and 1430*b* by bending their fingers 1692, and the amount of deflection can be sensed by the deflection sensors 1436*a* and 1436*b*. In some implementations, the amount of flexure can be varied and interpreted by the controller at an analog input that can be used for throttle, speed, or any other appropriate analog control of the remotely operated vehicle.

The hand grips 1420*a* and 1420*b* include a web 1428*a* and a web 1428*b*. In the illustrated example, the webs 1428*a* and 1428*b* are configured as a collection of alternating ribs and cavities or troughs defined in an underside (e.g., opposite the user's fingers 1692) of the flexible paddles 1430*a* and 1430*b*. The webs 1428*a* and 1428*b* are oriented substantially parallel to the hand grips 1420*a* and 1420*b* proximal to the paddle ends 1432*a* and 1432*b* to promote flexure about the hand grips 1420*a* and 1420*b* when squeezed.

Referring now primarily to FIG. 16, the flexible paddle 1430*b* is shown in a neutral configuration 1490*a* in which the flexible paddle 1430*b* is in a substantially neutral, undeflected position. The user's fingers 1692 are substantially fully extended in a flat pose. As the user bends his or her fingers 1692, the flexible paddle 1430*b* will bend or curl, for example to a deflected configuration 1490*b*. The web 1428*b* provides a guide or backstop for the flexure of the flexible paddle 1430*b*. In some embodiments, the web 1428*b* (and the web 1428*a*) can function as a mechanical limit on the analog input (e.g., a throttle limiter). In some embodiments, the web 1428*a* and 1428*b* can protect the flexible paddles 1430*a* and 1430*b* from damage due to sharp, excessive bending or folding. For example, as the flexible paddles 1430*a*, 1430*b* are bent, the cavities can contract or compress as the ribs are moved closer to each other until the ribs come into contact with each other, providing increased resistance to further flexure of the flexible paddles 1430*a*, 1430*b*.

In some embodiments, different flexible paddles having different shapes, sizes, or radiuses can be removably interchanged with the flexible paddles 1430*a* and 1430*b*. In some embodiments, the flexible paddles 1430*a* and 1430*b* can be interchanged to customize the input device to different users having different hand and/or finger sizes, to accommodate different finger strengths, and/or compliment the natural grip of the user (e.g., bigger sizes for bigger hands, smaller sizes for smaller hands, stiffer for stronger hands, more pliable for weaker hands). In some embodiments, the flexible paddles 1430*a* and 1430*b* can be interchanged to change a mechanical limiting effect on user input (e.g., bigger sizes to limit flex and an amount of input, smaller sizes to permit a greater range of flexibility and higher levels of input).

In some embodiments, the flexible paddles 1430*a* and 1430*b* can be interchanged with pressure sensors that can sense pressure or grip being applied by a user's fingers, substantially without moving or flexing. In some embodiments, the flexible paddles 1430*a* and 1430*b* can be interchanged with trigger or throttle style inputs (e.g., like a pistol trigger, like an all-terrain vehicle or personal watercraft throttle) that can partially pivot to sense an amount of input from the user.

In some embodiments, the overall shape of the example input device 1400 could have different forms from the one shown in the illustrated examples. For example, the example input device 1400 could be configured with a shape similar to a butterfly, drop, aero, cruiser, pullback, or other styles of bicycle handlebars. In some embodiments, the example input device 1400 can be configured as two joysticks connected by a bar and optionally having a central bend (e.g., about 90 degrees).

In some embodiments, one or more cameras, a virtual reality (VR) or augmented reality (AR) input device can be used. For example, a machine vision sensor can include at least one camera configured to capture images of an orientation of the human hand(s) as if they were holding the example input device 100 or the example input device 1400, and the position controller can be configured to determine an input orientation based on the captured images. The at least one camera can also be configured to capture images of an extensile configuration of fingers of the user's human hand as if they were holding and manipulating the example input device 100 or 1400, and the controller can be configured to determine a variable input based on the captured images instead of or in addition to the deflection sensors. In some embodiments, wearable sensors can be used. For example, the user can wear a pair of gloves equipped with orientation sensors and/or position sensors, and/or flex sensors in the fingers to sense the movement of the user's hands and extensile configuration of the user's fingers, as if holding and manipulating the example input device 100 or 1400.

In some embodiments, the example input device 1400 can include externally accessible and/or removable storage memory. For example, the input device 1400 can include internal FLASH memory that can be accessed by an input/output port (e.g., USB) or wirelessly (e.g., BLUETOOTH, WIFI). In another example, the input device 1440 can include a port or slot that can accept a removable memory device (e.g., USB thumb drive, SD card). The memory can be used to store and retrieve data that can be used to configure, tune, calibrate, and/or customize the performance of the input device 1400. For example, multiple users may use the same input device 1400, but may wish to have personalized configurations. In such examples, users may be able to insert a personal SD card into the shared input device 1400 to configure the input device 1400 for their unique individual preferences.

In some implementations, the example input device 1400 can be configured (e.g., based on a configuration file stored in the externally accessible and/or removable storage memory) with one or more performance tuning parameters. For, example, input device 1400 can be configured to apply a smoothing function to the user's throttle input. In some implementations, use of a smoothing function can reduce a drone's power consumption (e.g., by leveling out oscillatory input "jitter" and/or sudden input changes that might otherwise induce sudden and current-intensive bursts of thrust). For example, the smoothing function can be adjusted by the user using an SD card that has configuration information. The smoothing function can be adjusted and be applied any of the controllable axes.

In some implementations, the example input device 1400 can be configured with a user configuration file (e.g., stored in the externally accessible and/or removable storage memory) that enables users to modify device functions, such as increasing/decreasing input sensitivity, audio files that can be changed/replaced by the user, log files (e.g., for diagnostic purposes. In some implementations, configuration files may be editable (e.g., using a simple text editor or a dedicated software application) on a laptop or desktop computer, a tablet computer, a smart phone, or any other appropriate device that can provide a user interface (e.g., screen, keyboard, editing software) for accessing and editing configuration files for use by the input device 1400.

FIGS. 17A-18C are views of the example input device 1400 in various ergonomic configurations. In general, the hand grips 1420*a* and 1420*b* are end bodies configured to pivot relative to the elongate central body 1410 about the joint 1460*a* and the joint 1460*b*, for example, to orient the hand grips 1420*a* and 1420*b* at angles that are ergonomically natural for the user, and/or to fold the input device 1400 into a compact form for storage or transport.

Figure 17A:
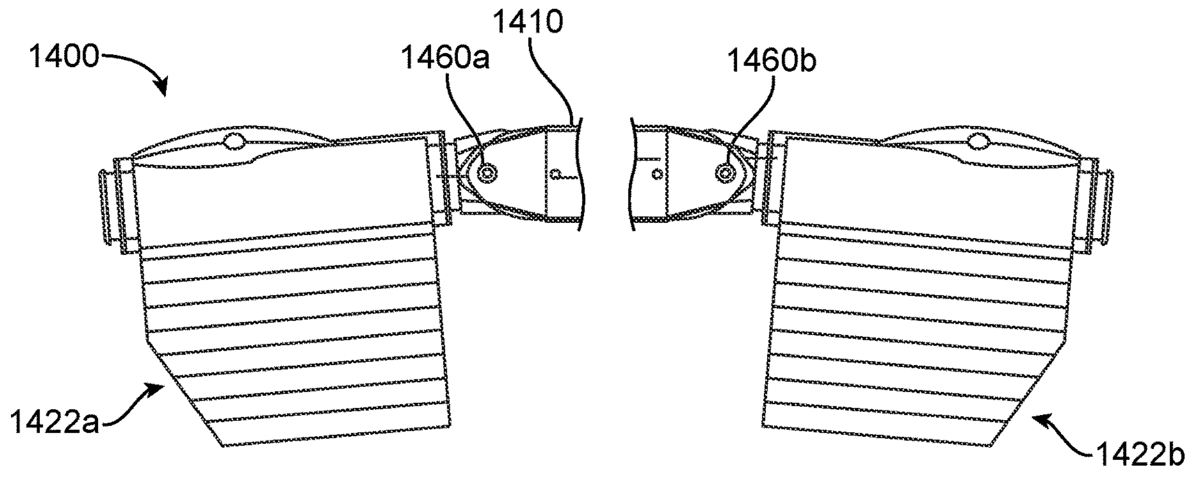
FIGS. 17A-18C are views of the example user input device in various ergonomic configurations.
Figure 18A:
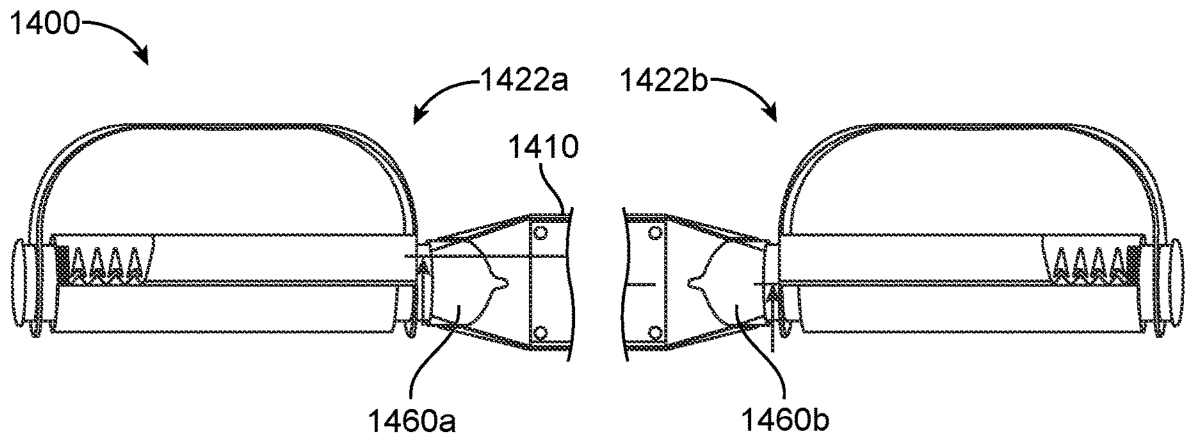

FIG. 17A shows a partial top side view of the input device 1400, and FIG. 18A shows a partial front side view of the input device 1400, in which the hand grips 1420*a* and 1420*b* are at or near a fully extended configuration across the joints 1460*a* and 1460*b* from the elongate central body 1410. For example, an adult of average size may prefer to use the fully extended configuration.

Figure 17B:
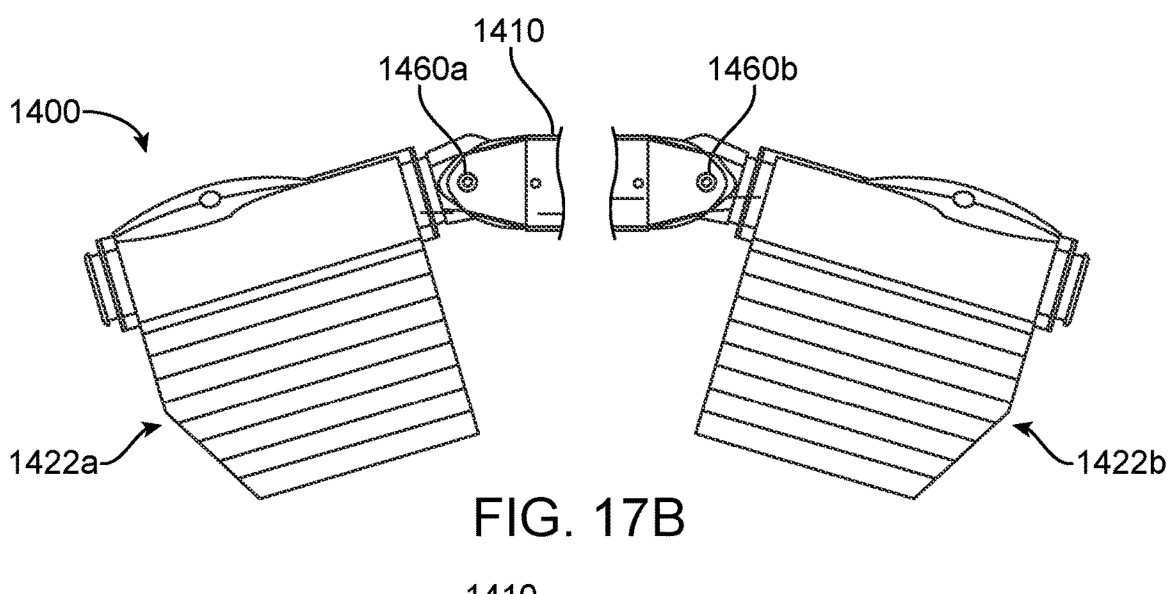
Figure 18B:
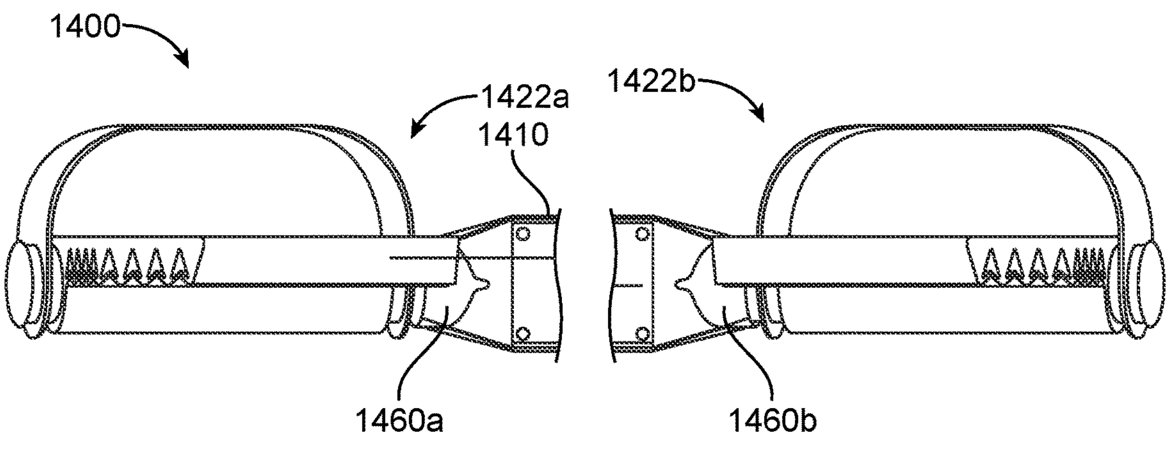

FIG. 17B shows a partial top side view of the input device 1400, and FIG. 18B shows a partial front side view of the input device 1400, in which the hand grips 1420*a* and 1420*b* are in a partly extended configuration across the joints 1460*a* and 1460*b* from the elongate central body 1410. For example, the partly extended configuration may be used by a child or an adult of smaller than average size. In another example, the partly extended configuration can be a midpoint configuration of the input device 1400 as the input device 1400 is being folded for storage or transport.

Figure 17C:
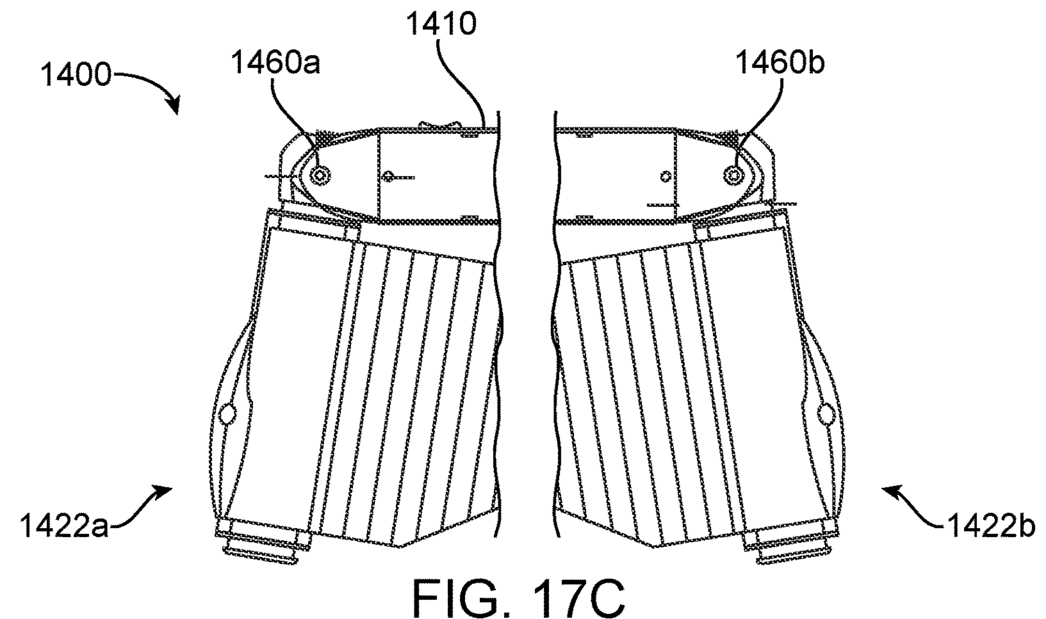
Figure 18C:
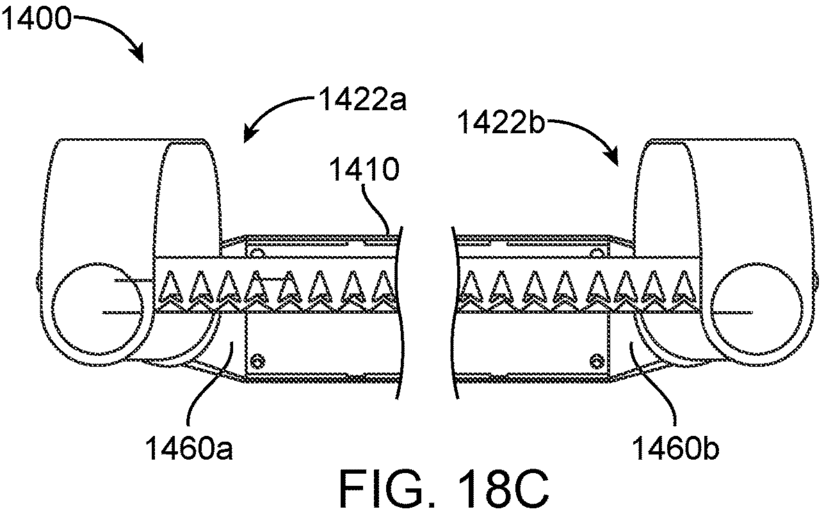

FIG. 17C shows a partial top side view of the input device 1400, and FIG. 18C shows a partial front side view of the input device 1400, in which the hand grips 1420*a* and 1420*b* are in a substantially fully retracted or collapsed configuration across the joints 1460*a* and 1460*b* from the elongate central body 1410. For example, the retracted configuration may be used to make the input device 1400 fit into a compact space or container for storage or transport.

Figure 19A:
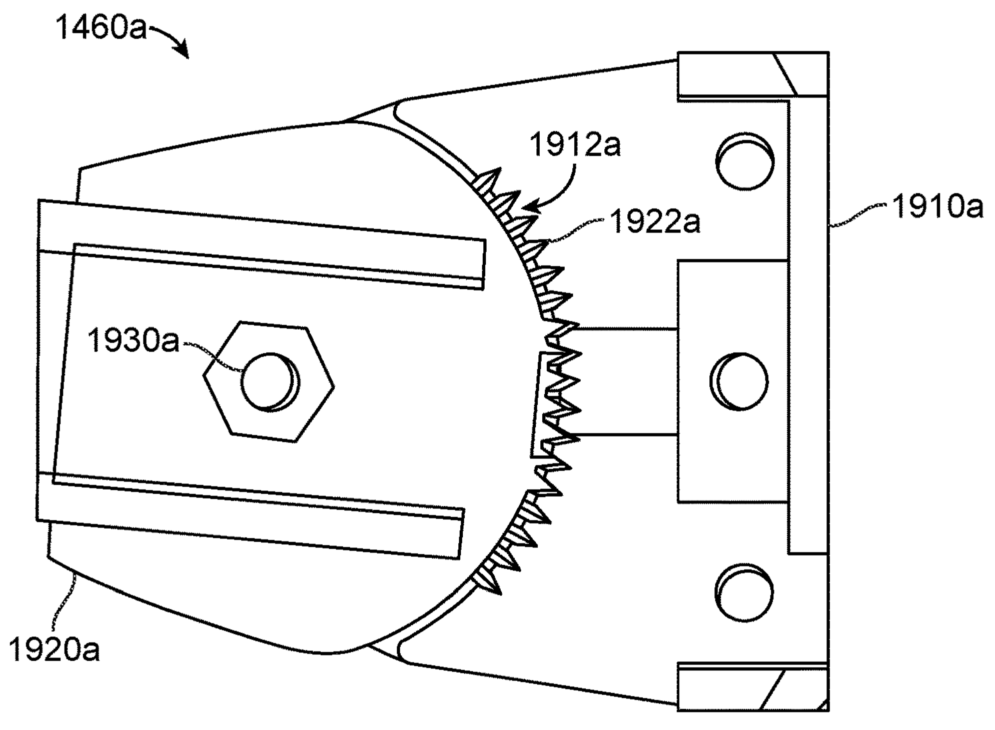
FIGS. 19A-19H are perspective and sectional views of example joints of the example user input device.
Figure 19B:
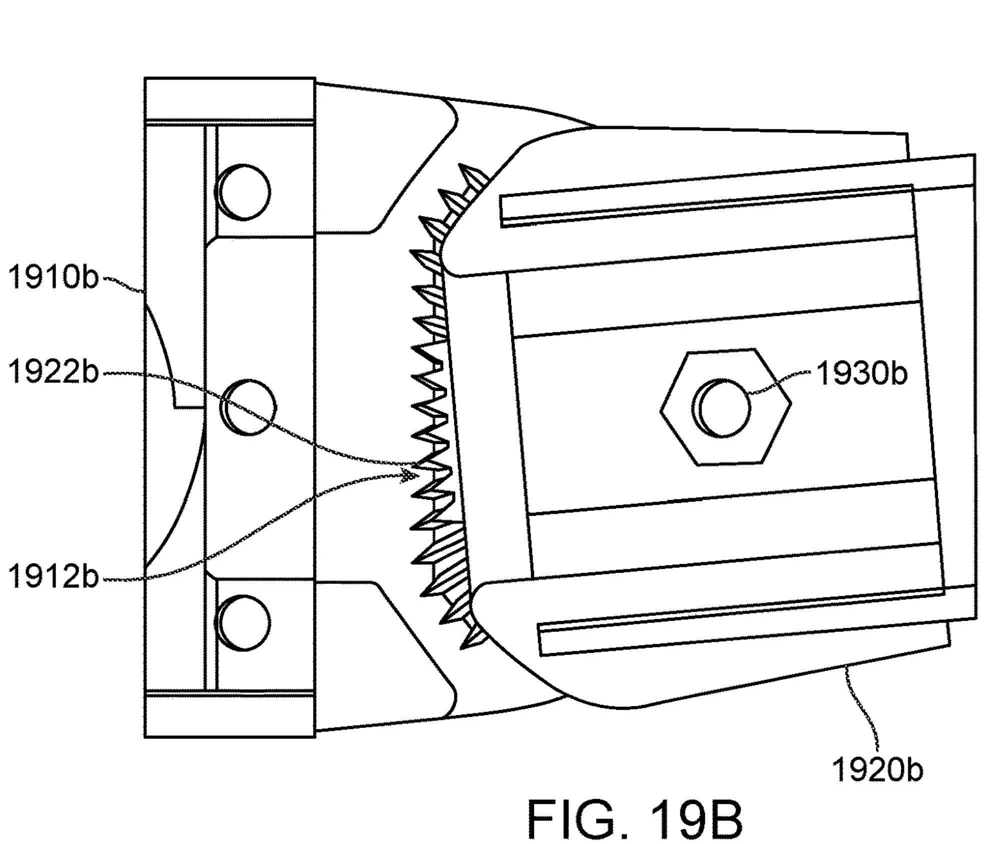

FIGS. 19A and 19B are sectional views of the example joints 1460*a* and 1460*b* of the example input device 1400. The joint 1460*a* includes a cuff 1910*a* and a rotor 1920*a* that is configured to partly rotate relative to the cuff 1910*a* about an axis 1930*a*. The joint 1460*b* includes a cuff 1910*b* and a rotor 1920*b* that is configured to partly rotate relative to the cuff 1910*b* about an axis 1930*b*. The cuffs 1910*a* and 1910*b* are affixed to the elongate central body 1410, and the rotors 1920*a* and 1920*b* are affixed to the hand grips 1420*a* and 1420*b*. In use, the joints 1460*a* and 1460*b* act as a pivot or hinge between the elongate central body 1410 and the hand grips 1420*a* and 1420*b*.

The rotor 1920*a* includes a collection of teeth 1922*a*, and the cuff 1910*a* includes a collection of teeth 1912*a* that are configured to compliment and intermesh with the teeth 1922*a*. In use, the collections of teeth 1912*a* and 1922*a* intermesh to resist rotation of the rotor 1920*a* relative to the cuff 1910*a*. The rotor 1920*b* includes a collection of teeth 1922*b*, and the cuff 1910*b* includes a collection of teeth 1912*b* that are configured to compliment and intermesh with the teeth 1922*b*. In use, the collections of teeth 1912*a* and 1922*a* intermesh to resist rotation of the rotor 1920*a* relative to the cuff 1910*a*, and the collections of teeth 1912*b* and 1922*b* intermesh to resist rotation of the rotor 1920*b* relative to the cuff 1910*b*.

The collections of teeth 1912*a* and 1922*a* are configured to intermesh and resist a predetermined amount of torque of the rotor 1920*a* relative to the cuff 1910*a*. For example, the joints 1460*a* and 1460*b* can be configured to maintain the rotors 1920*a* and 1920*b* in a predetermined rotary position relative to their respective cuffs 1910*a* and 1910*b* under expected usage conditions (e.g., forces normally exerted by the user on the input device 1400 while piloting a remote vehicle). The joints 1460*a* and 1460*b* can also be configured to permit pivoting of the rotors 1920*a* and 1920*b* relative to their respective cuffs 1910*a* and 1910*b* under higher forces (e.g., the positions can be kept steady under normal use, and then change when the user purposely applies a force to fold up the input device 1400 for storage).

In some embodiments, one or more of the collections of teeth 1912*a*, 1912*b*, 1922*a*, and/or 1922*b* can be formed of a compliant (e.g., elastic) material having a predetermined elasticity. For example, the material can be selected or configured such that the teeth 1912*a*, 1912*b*, 1922*a*, and/or 1922*b* have sufficient stiffness to provide mechanical interference against inadvertent movement, and bend or flex under higher forces (e.g., a user trying to fold or otherwise reorient the hand grips 1420*a* and 1420*b*) to permit a ratcheting movement of the rotors 1920*a* and 1920*b* relative to the cuffs 1910*a* and 1910*b* as the teeth flex and slip past each other.

In some embodiments, one or more of the collections of teeth 1912*a*, 1912*b*, 1922*a*, and/or 1922*b* can be configured to mechanically engage and disengage with each other. For example, the teeth 1912*a* and 1912*b* can be configured to controllably extend and retract into and out of engagement with the teeth 1922*a* and 1922*b*. When extended or otherwise engaged, the teeth 1912*a*, 1912*b*, 1922*a*, and 1922*b* intermesh to temporarily fix the joints 1460*a* and 1460*b* at selected angles. When retracted or otherwise disengaged, the teeth 1912*a*, 1912*b*, 1922*a*, and 1922*b* substantially do not interfere with each other and permit substantially free pivotable movement of the joints 1460*a* and 1460*b*.

Figures 19C, 19D:
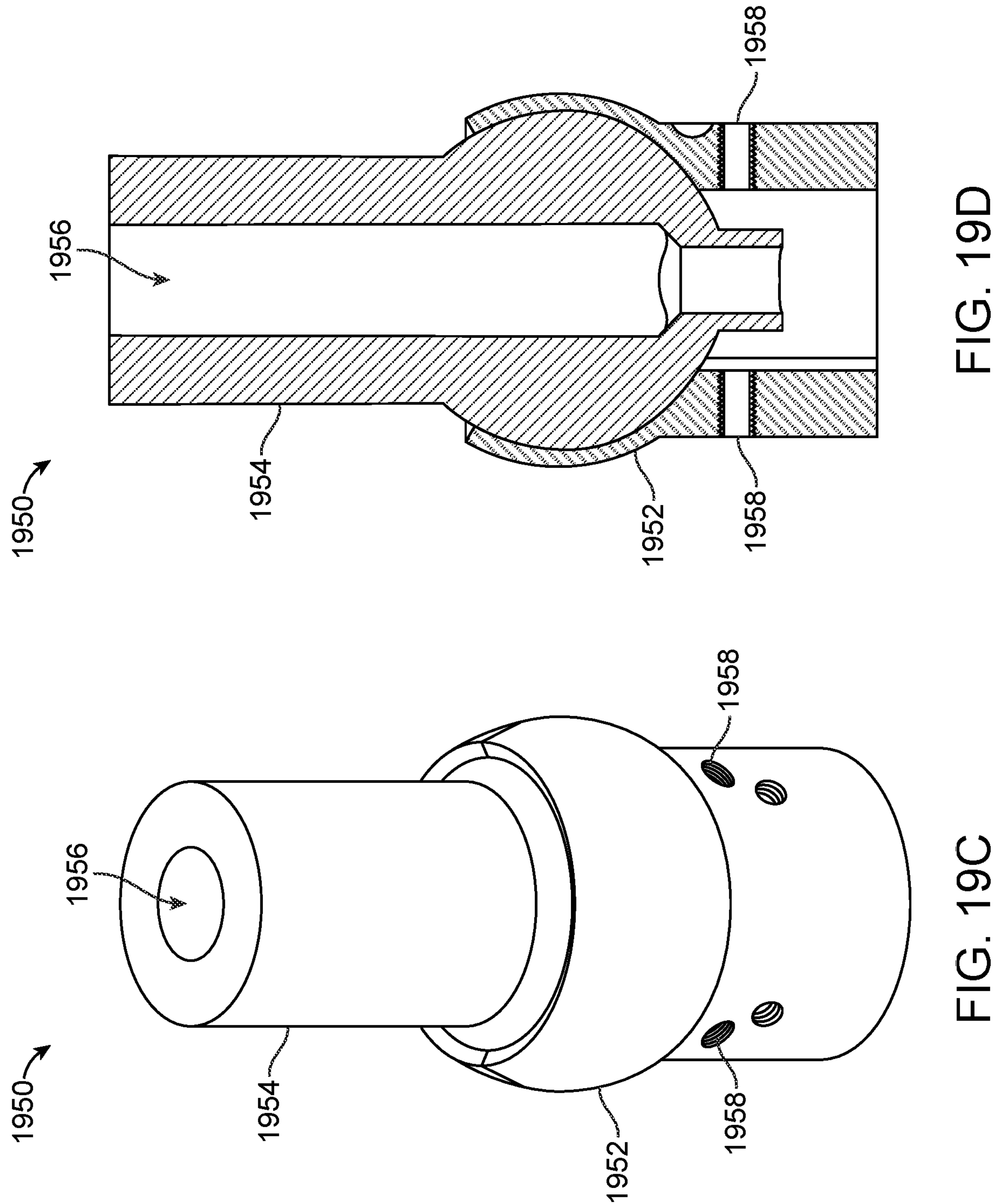

FIGS. 19C and 19D are perspective and sectional view, respectively, of an example joint 1950. In some embodiments, the joint 1950 can be used in place of or in addition to the example joints 1460*a* and 1460*b* of the example input device 1400. The joint 1950 includes a cuff 1952 and a rotor 1954 that form a ball joint that is configured to partly rotate relative to the cuff 1952. The cuff 1954 can be affixed to the elongate central body 1410, and the rotor 1952 can be affixed to one of the hand grips 1420*a* and 1420*b*. In use, the joint 1950 can act as a pivot or hinge between the elongate central body 1410 and the hand grips 1420*a* and 1420*b*. A cavity 1956 is provided for the passage of power and/or communication wires to the hand grip 1420*a* or 1420*b*. The cuff 1952 includes collection of threaded apertures 1958. Set screws (not shown) can be threaded into the threaded apertures 1958 to contact the rotor 1954 to reversibly fix the position of the rotor 1954 relative to the cuff 1952.

Figures 19E, 19F:
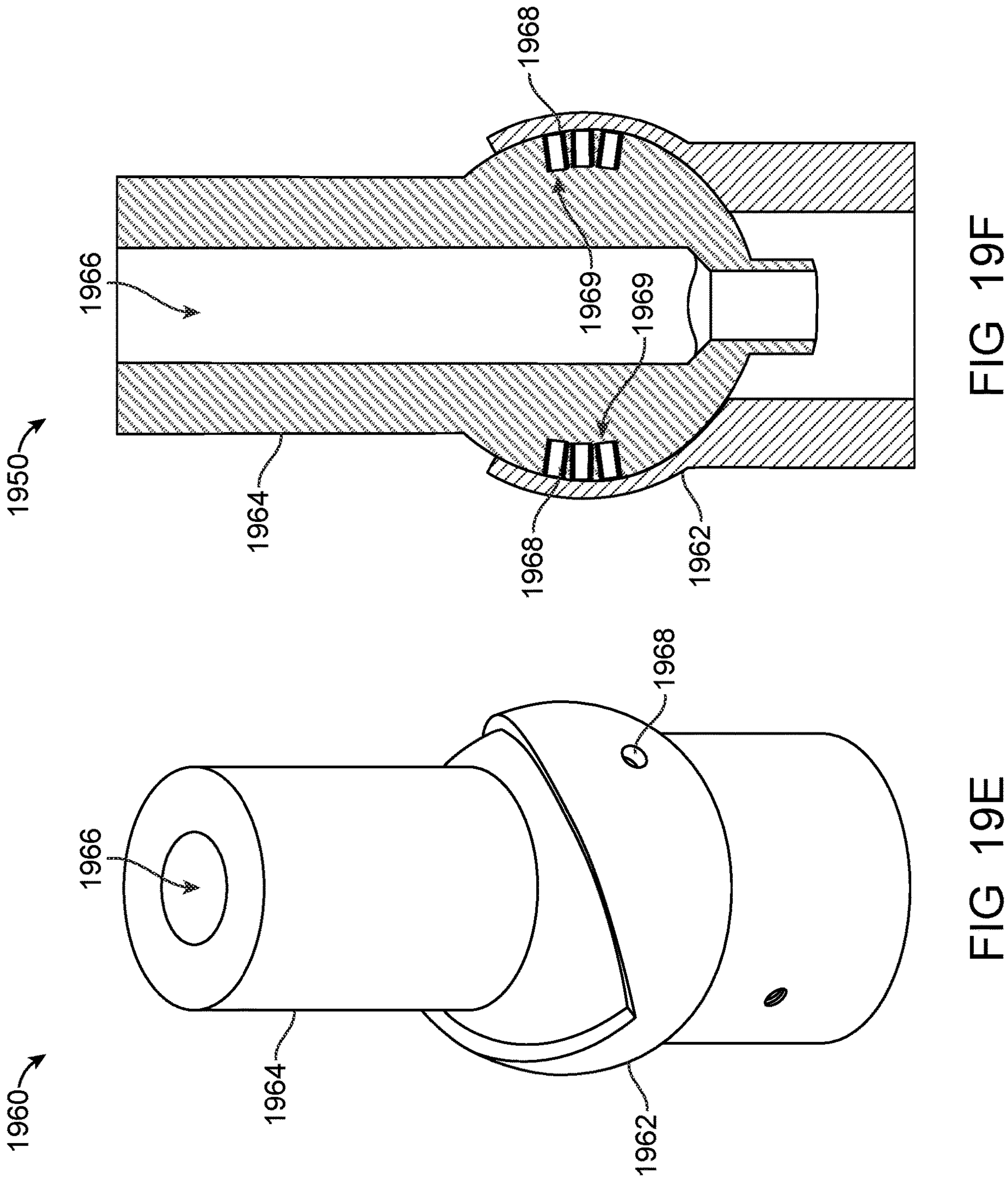

FIGS. 19E and 19F are perspective and sectional view, respectively, of an example joint 1960. In some embodiments, the joint 1960 can be used in place of or in addition to the example joints 1460*a* and 1460*b* of the example input device 1400. The joint 1960 includes a cuff 1962 and a rotor 1964 that form a ball joint that is configured to partly rotate relative to the cuff 1962. The cuff 1964 can be affixed to the elongate central body 1410, and the rotor 1962 can be affixed to one of the hand grips 1420*a* and 1420*b*. In use, the joint 1960 can act as a pivot or hinge between the elongate central body 1410 and the hand grips 1420*a* and 1420*b*. A cavity 1966 is provided for the passage of power and/or communication wires to the hand grip 1420*a* or 1420*b*. The cuff 1962 includes collection of threaded apertures 1968 and the rotor 1964 includes a collection of threaded apertures 1969. The rotor 1964 can be angled relative to the cuff 1962 such that a pair of the apertures 1969 align with the apertures 1968. Set screws (not shown) can be threaded into the threaded through the apertures 1968 into the threaded apertures 1969 to reversibly fix the position of the rotor 1964 relative to the cuff 1962.

Figure 19G:
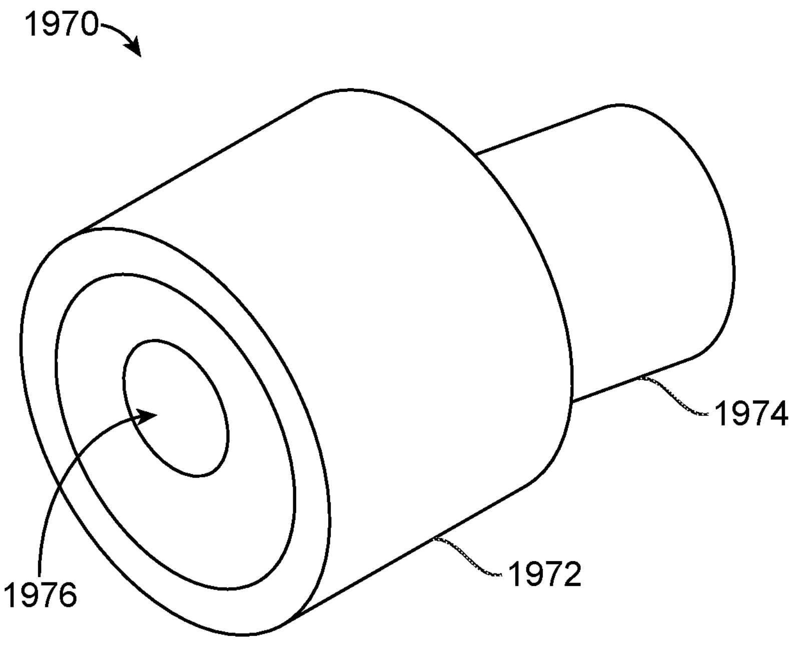
Figure 19H:
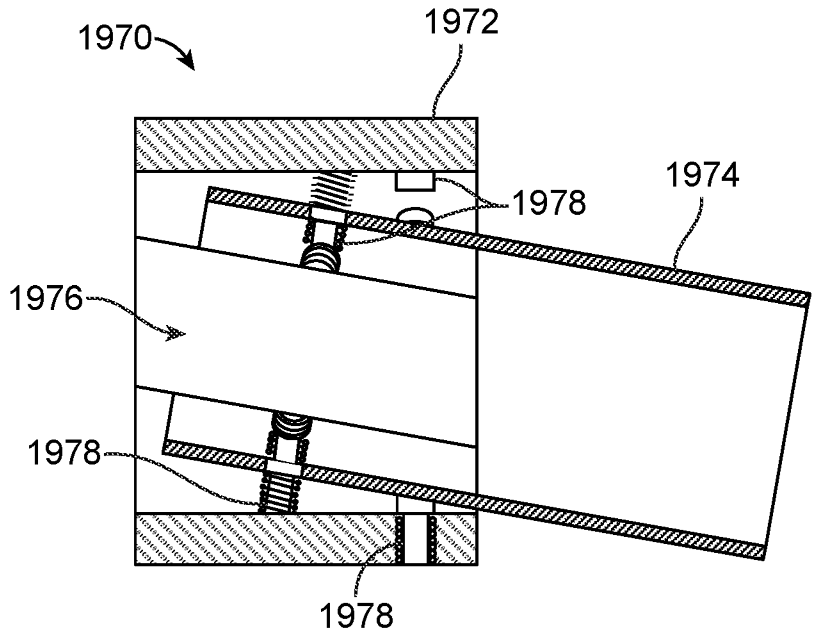

FIGS. 19G and 19H are perspective and sectional view, respectively, of an example joint 1970. In some embodiments, the joint 1970 can be used in place of or in addition to the example joints 1460*a* and 1460*b* of the example input device 1400. The joint 1970 includes a cuff 1972 and a rotor 1974 that form an eccentric rotary joint that is configured to partly rotate relative to the cuff 1972. The cuff 1974 can be affixed to the elongate central body 1410, and the rotor 1972 can be affixed to one of the hand grips 1420*a* and 1420*b*. In use, the joint 1970 can act as a pivot or hinge between the elongate central body 1410 and the hand grips 1420*a* and 1420*b*. A cavity 1976 is provided for the passage of power and/or communication wires to the hand grip 1420*a* or 1420*b*. The cuff 1972 includes collection of threaded apertures 1978. Set screws (not shown) can be threaded into the threaded apertures 1978 to contact the rotor 1974 to reversibly fix the rotational position of the rotor 1974 relative to the cuff 1972.

Figure 20:
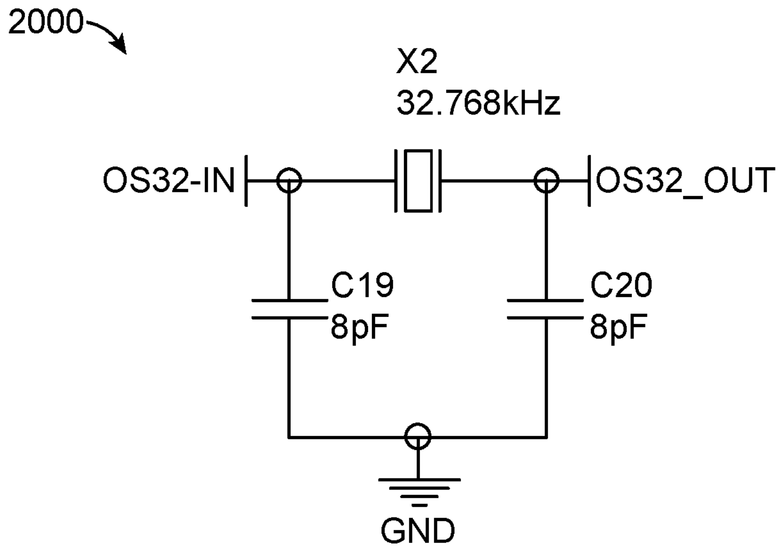
FIGS. 20-29 are schematic diagrams of various circuits of the example user input device.
Figure 20:
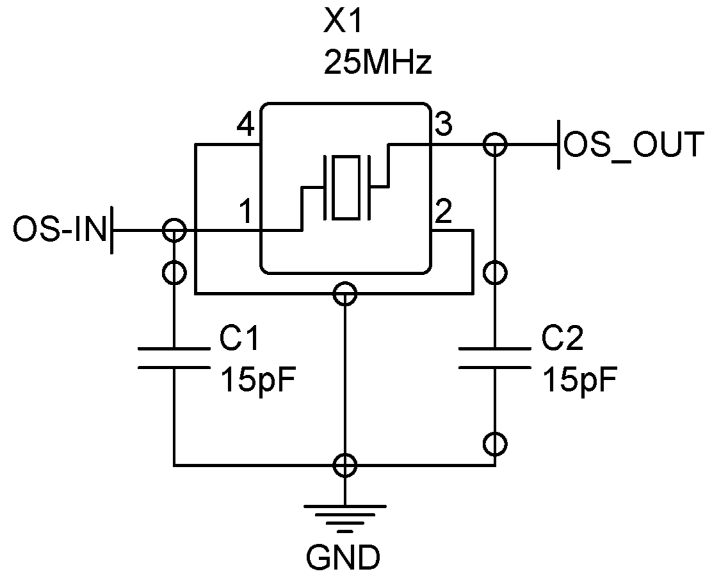
Figure 21:
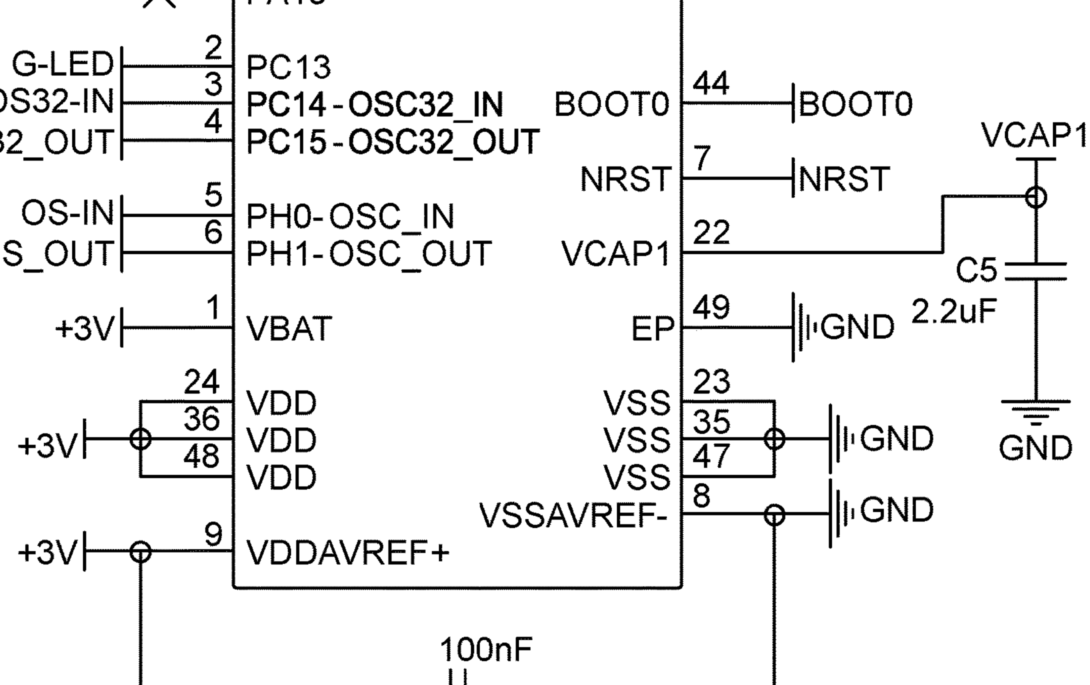
Figure 22:
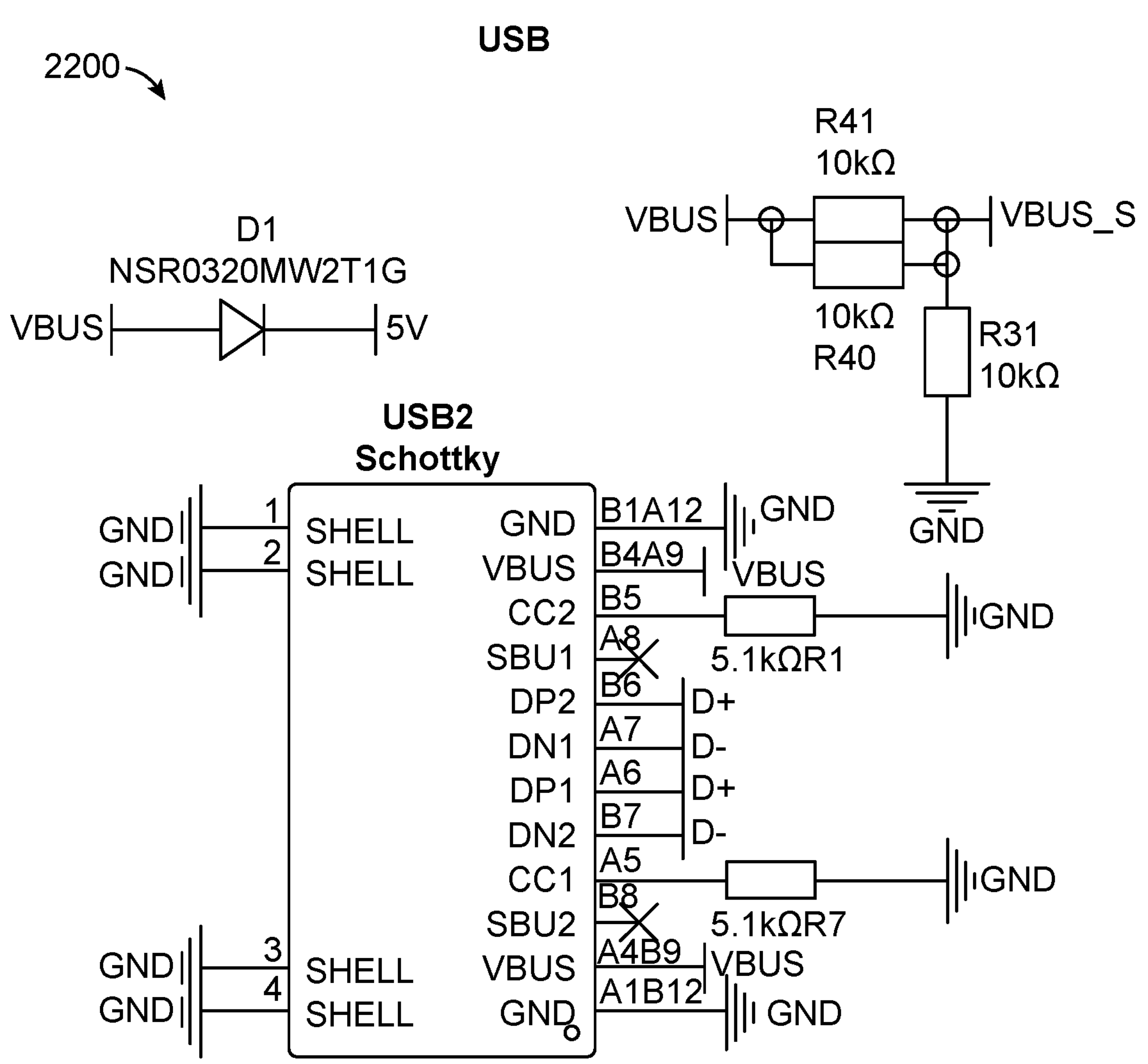
Figure 23:
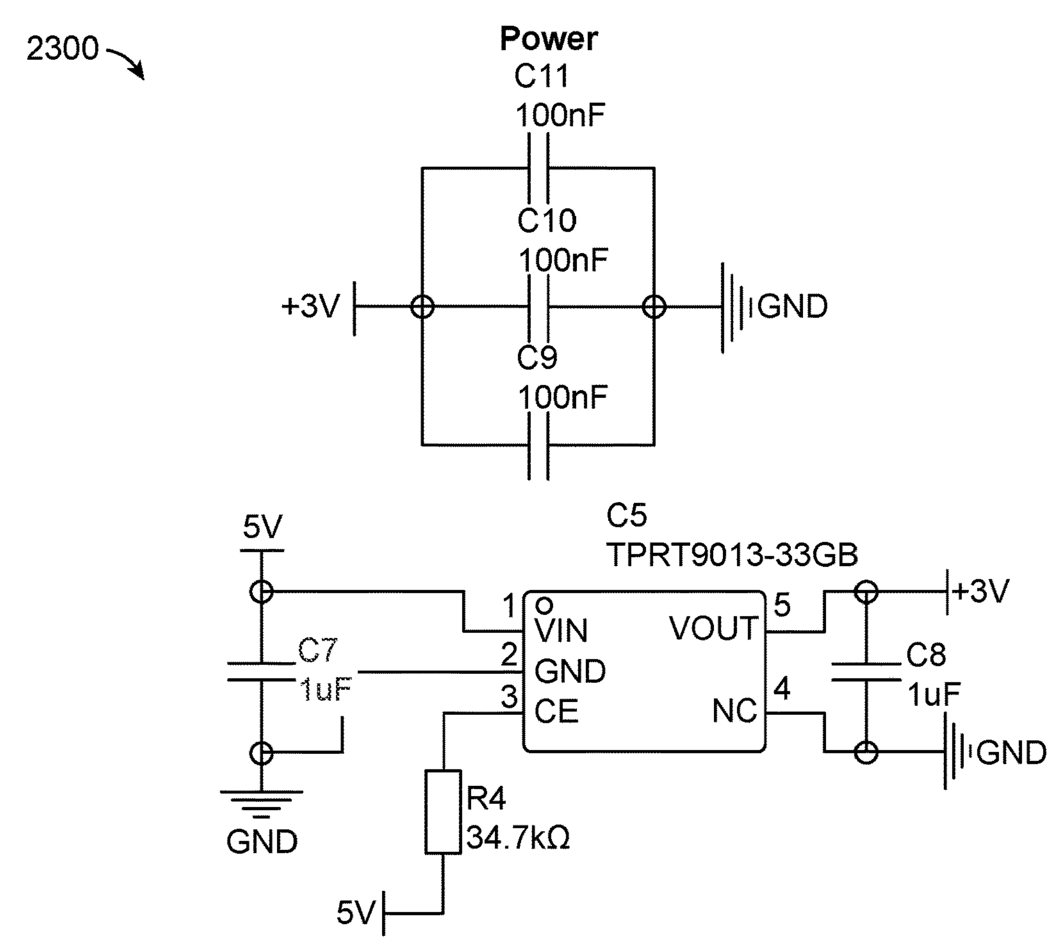
Figure 23:
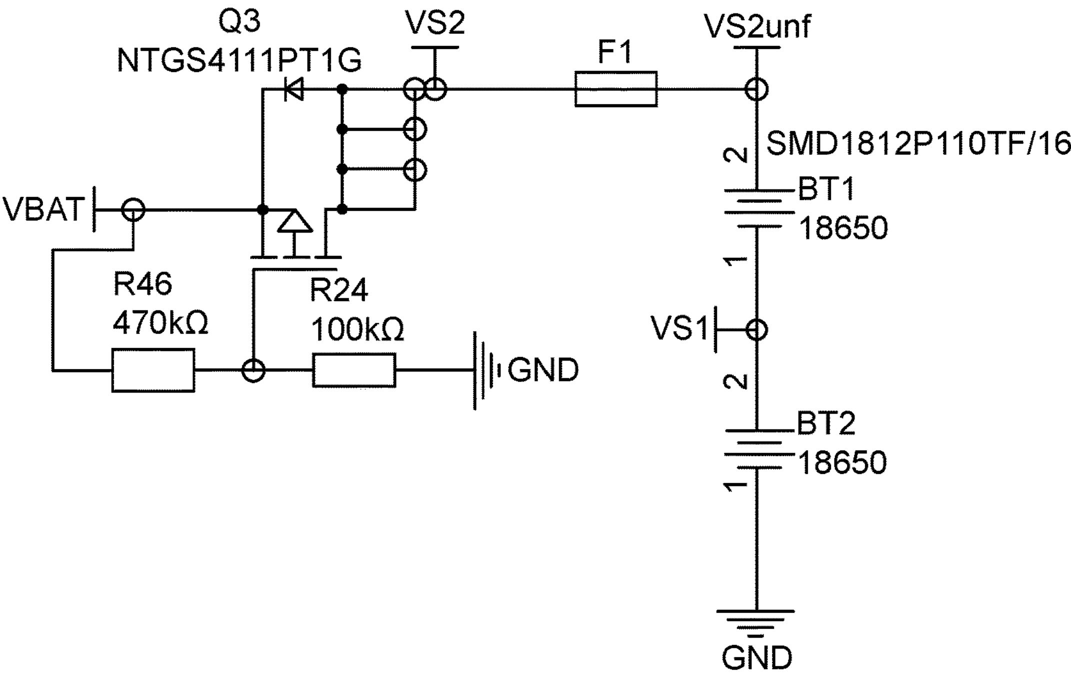

FIGS. 20-29 are schematic diagrams of various circuits of the example input device 1400. FIG. 20 shows an example crystal timer circuit 2000. FIG. 21 shows an example controller circuit 2100. FIG. 22 shows an example universal serial bus (USB) controller circuit 2200. FIG. 23 shows several example power circuits 2300. FIG. 24 shows an example user input circuit 2400, including the orientation sensor circuit 2420*c*. In some embodiments, the orientation sensor circuit 2420*c* can provide feedback such as absolute orientation (e.g., Euler vector, 100 Hz), three axis orientation data based on a 360° sphere, absolute orientation (e.g., quaternion, 100 Hz), four point quaternion output (e.g., for more accurate data manipulation), angular velocity vector (100 Hz), three axes of rotation speed (e.g., in rad/s), acceleration vector (100 Hz), three axes of acceleration (e.g., gravity and linear motion in m/s^2), magnetic field strength vector (20 Hz), three axis of magnetic field sensing (e.g., in micro Tesla (uT)), linear acceleration vector (100 Hz), three axes of linear acceleration data (e.g., acceleration minus gravity in m/s^2), gravity vector (100 Hz), three axis of gravitational acceleration (e.g., minus any movement, in m/s^2), temperature (1 Hz), and/or ambient temperature (e.g., in degrees Celsius). In some embodiments, the orientation sensor circuit 2420*c* can be a BNO055 nine-axis absolute orientation sensor.

Figures 1, 25:
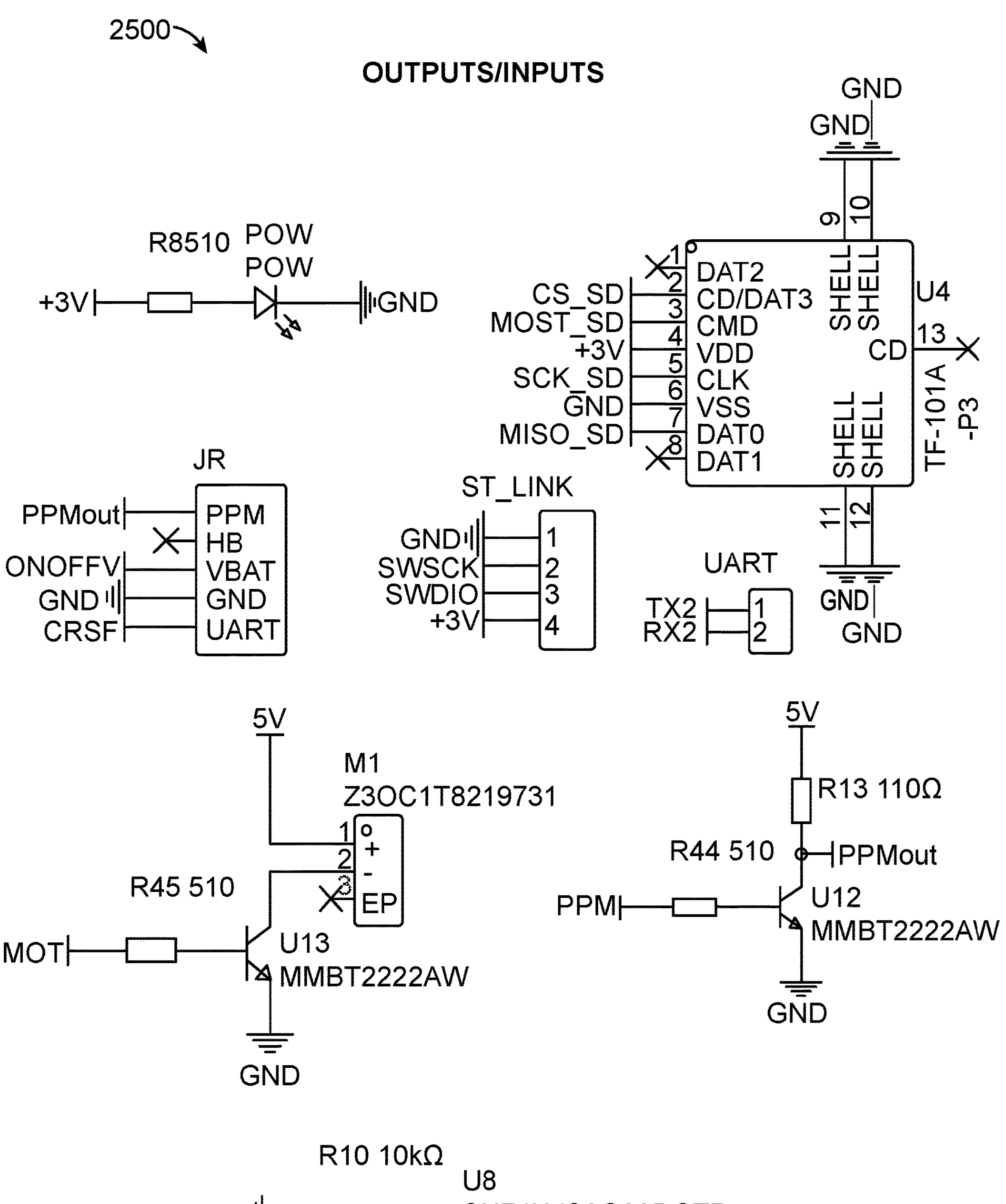
Figures 2, 25:
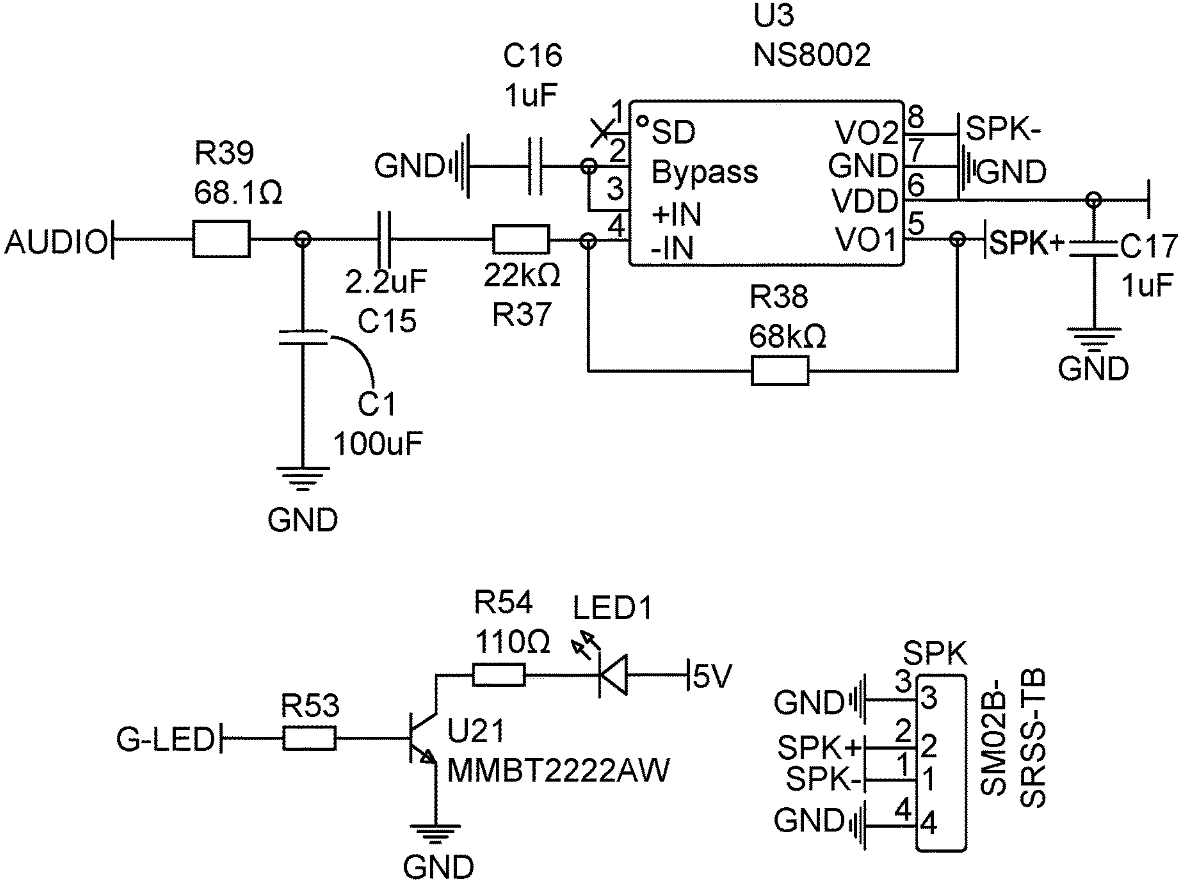
Figures 1, 26:
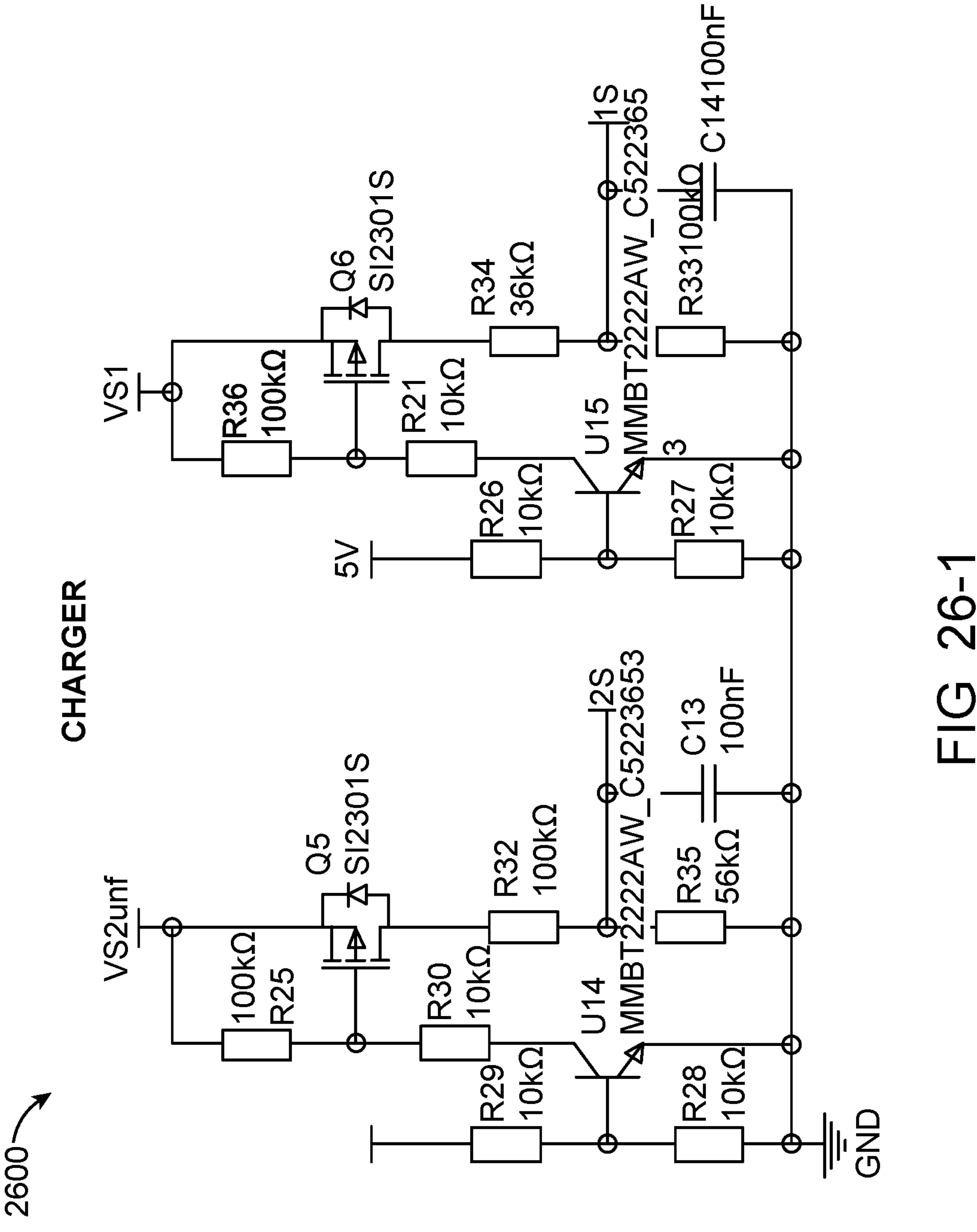
Figures 2, 26:
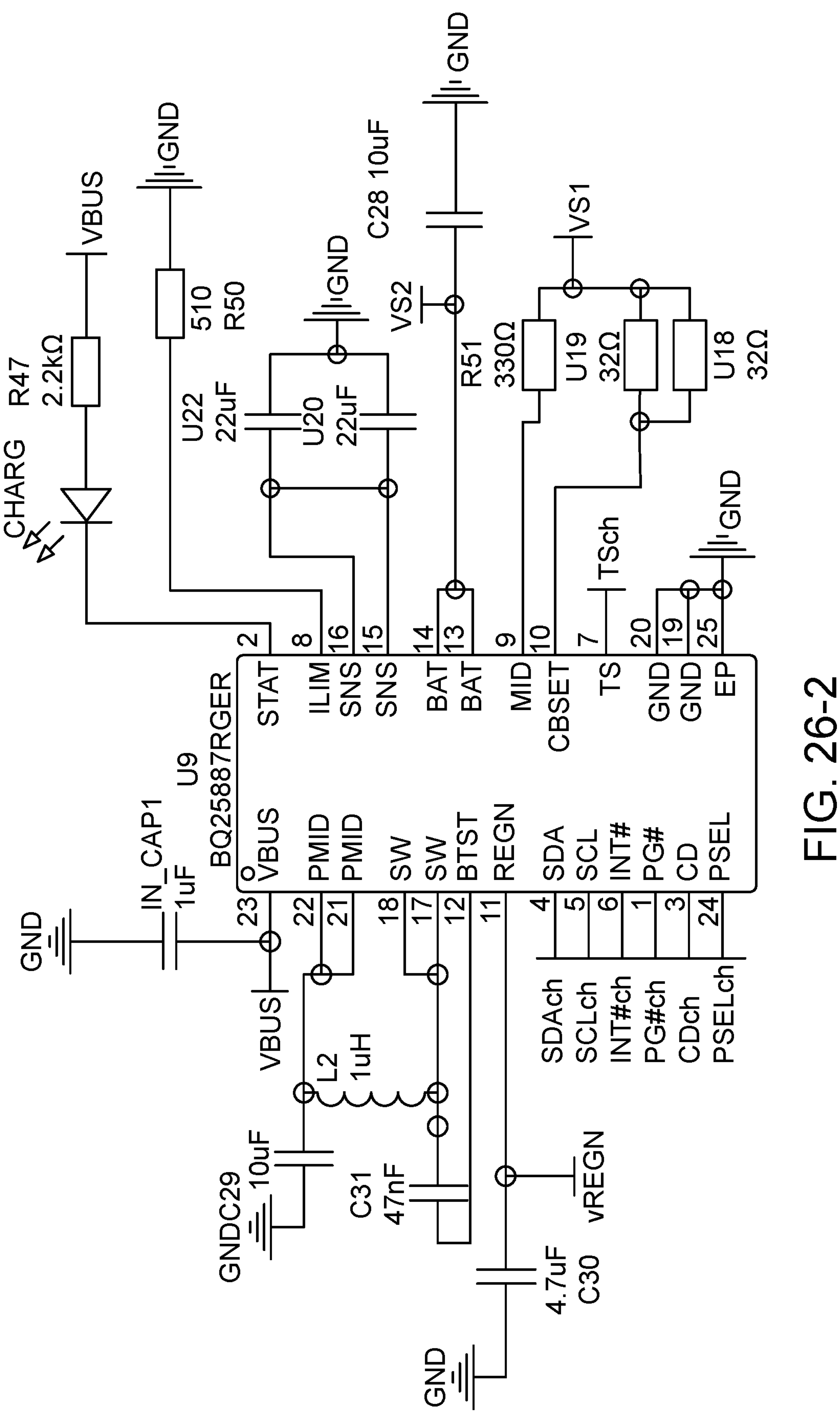
Figures 3, 26:
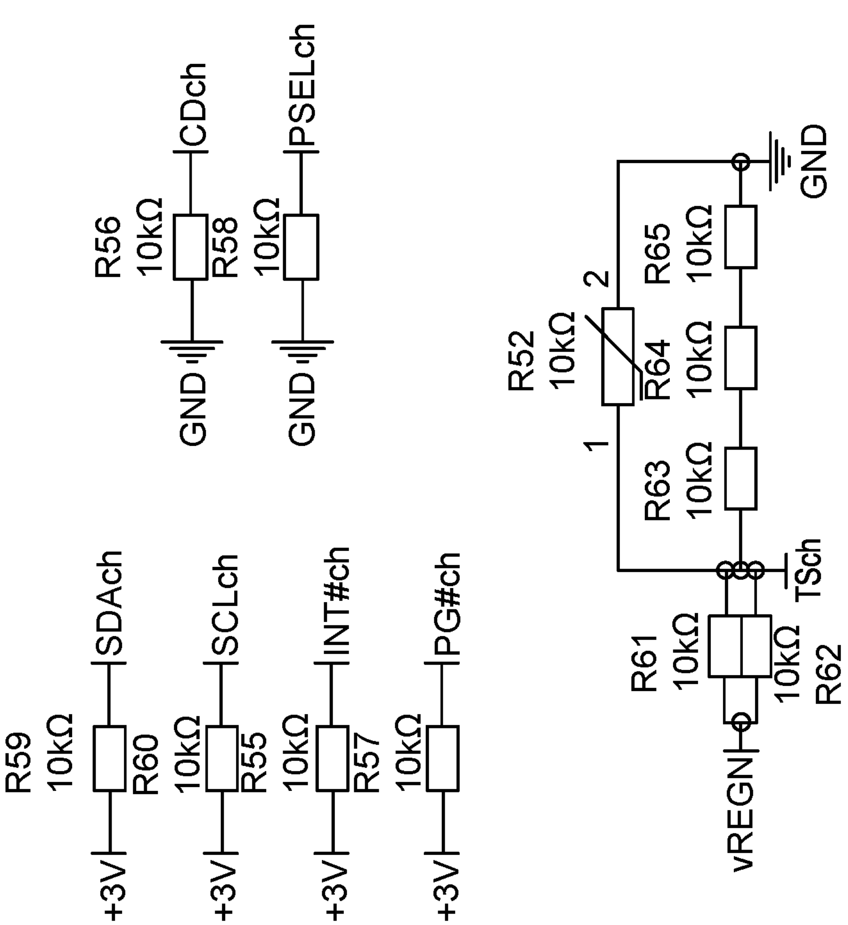
Figure 27:
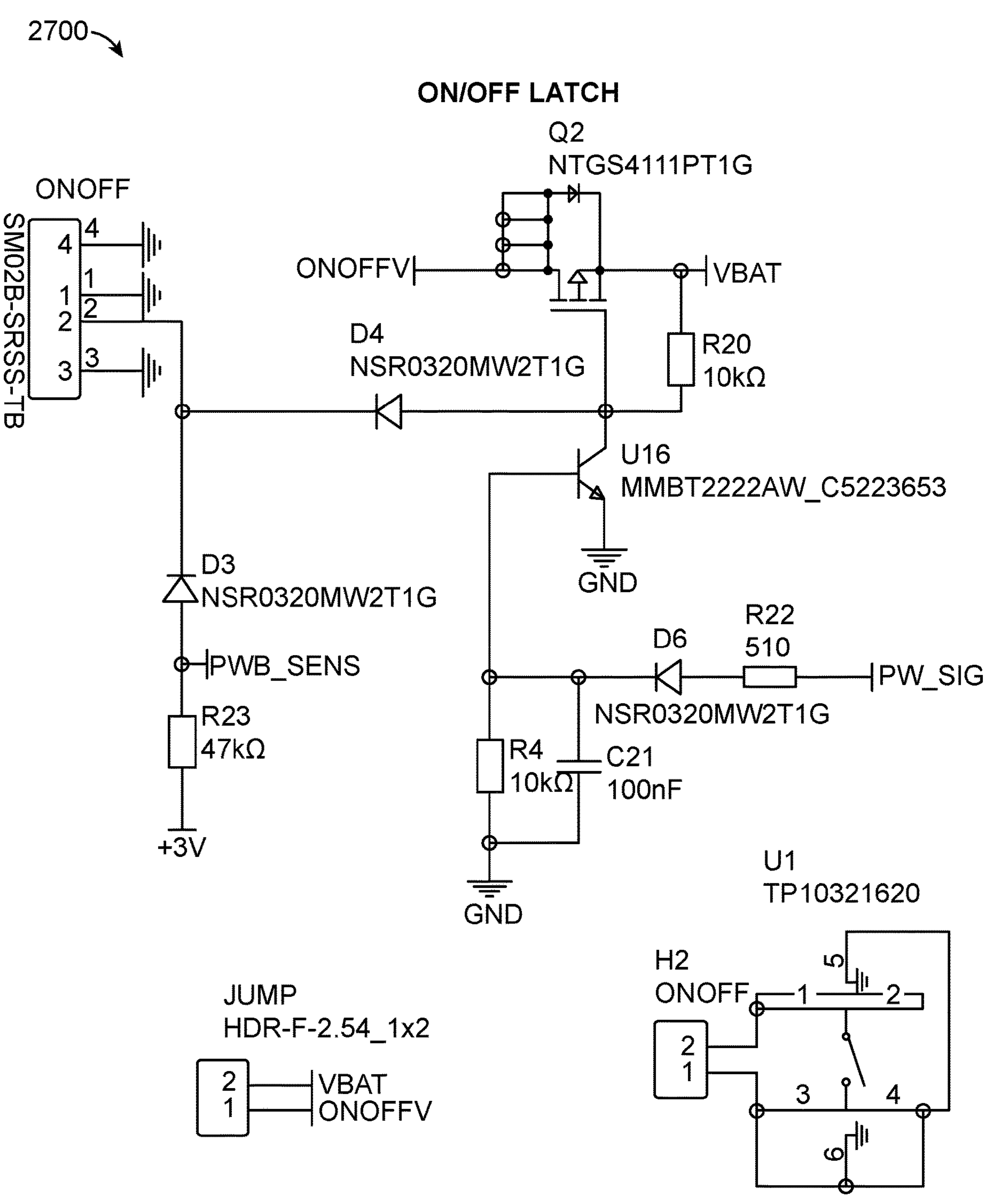
Figure 28:
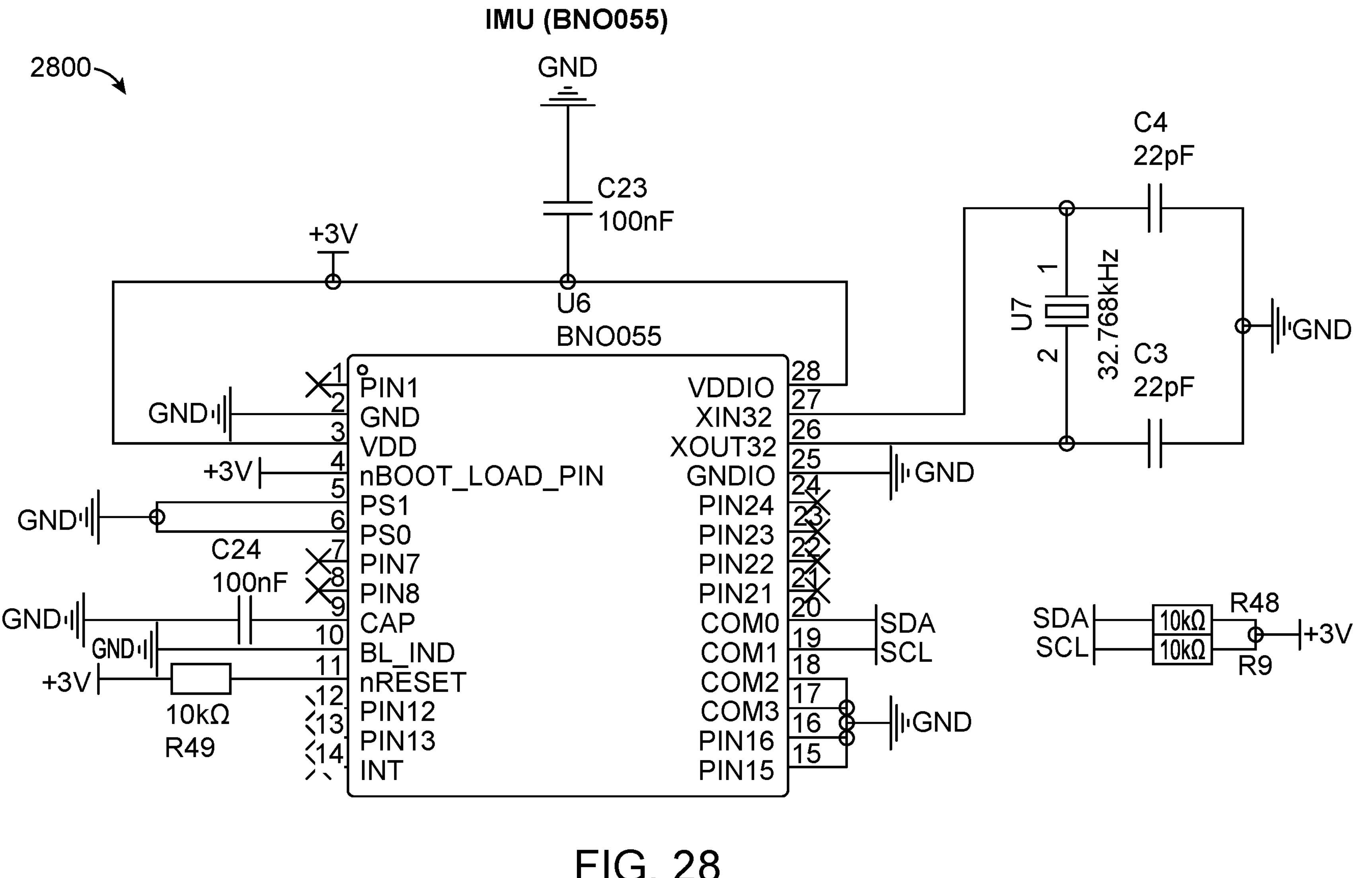
Figure 29:
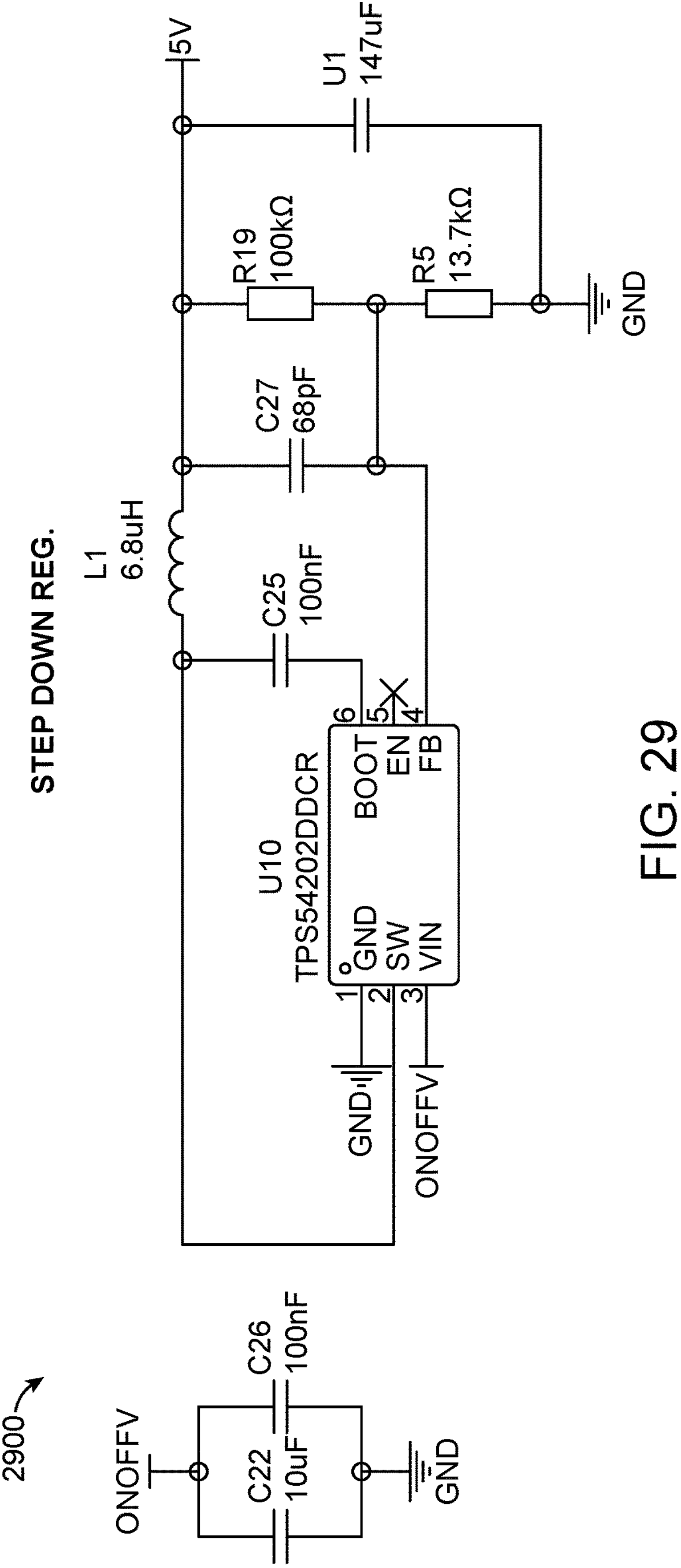

FIG. 25 shows several example input/output circuits 2500. FIG. 26 shows an example charging circuit 2600. FIG. 27 shows an example on/off circuit 2700. FIGS. 28 and 29 show example TTL logic adapter circuits 2800 and 2900.

Figure 30:
FIG. 30 is flow chart that shows an example of an operational process of the example user input device.
Figure 30:
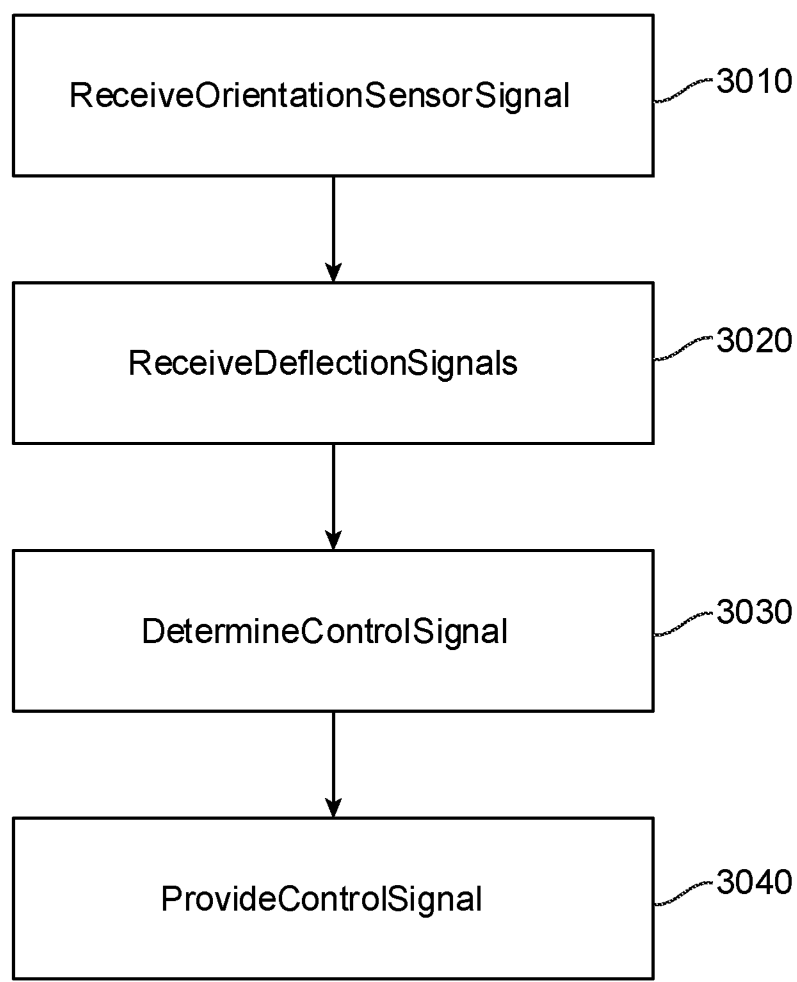

FIG. 30 is flow chart that shows an example of an operational process 3000 of the example user input device. The processes may be performed, for example, by a system such as the example input device 100 of FIGS. 1A-1D, the example circuitry of FIGS. 4-13, the example input device 1400 of FIGS. 14A-14E, the example circuitry of FIGS. 20-29, the example computing device 3100 of FIG. 31, and the example system 3150.

At 3010, an orientation sensor signal is received from an orientation sensor. For example, the example controller 2100 of FIG. 21 can receive feedback signals from the example orientation sensor circuit 2420*c* of FIG. 24 based on one or more of a positional heading, roll, and pitch of the example input device 1400.

In some embodiments, the orientation sensor can be configured to identify one or more of a pitch, a roll, and a yaw of an elongate central body. For example, the example input device 1400 is configured as an elongate central body having the hand grip 1420*a* as end body extending substantially axially away from the elongate central body at the axial end 1412*a* and the hand grip 1420*b* as an end body extending substantially axially away from the elongate central body at the axial end 1412*b* opposite the axial end 1412*a*, and the process 3000 can include moving, by a user in physical contact with at least one of the hand grip 1420*a* and the hand grip 1420*b*, the elongate central body.

At 3020, one or more deflection signals from one or more deflection sensors are received. For example, the example controller 2100 of FIG. 21 can receive feedback signals from the example deflection circuits 2420*a* and/or 2420*b* of FIG. 24. In use, user deflection of the flexible paddles 1430*a* and 1430*b* can cause the deflection circuit 2420*a* and 2420*b* to provide a variable deflection output signal that is representative of the amount of deflection or flexure of the flexible paddles 1430*a* and 1430*b*.

In some embodiments, the one or more deflection sensors can be configured to identify deflection of one or more flexible paddles relative to an elongate central body. For example, the elongate central body can include a flexible paddle having a first paddle end affixed proximal to an axial end of the elongate central body and extending tangentially away from the axial end to a second paddle end opposite the first paddle end, and one or more of the deflection sensors can be configured to identify an amount of deflection of the flexible paddle (e.g., by a user flexing his or her fingers).

At 3030, a control signal is determined based on one or more of the orientation sensor signal and the one or more deflection signals. For example, the controller 2100 can receive pitch, roll, yaw, and deflection signals, and transform them into a control signal that is representative of a heading, roll, yaw, and speed of a remotely operated vehicle.

At 3040, the control signal can be provided at a control signal output port. For example, the controller 2100 can provide the control signal to an electrical communications header in the compartment 1450. In some embodiments, a communications transceiver module can be arranged in the compartment 1450 and communicatively coupled to the header, such that the transceiver module can receive the control signal from the controller 2100.

In some implementations, the process 3000 can include controlling at least one of pitch, roll, yaw, heading, and throttle of a remotely operated vehicle or other mechanism based on the control signal. For example, a user can manipulate the input device 100 to pilot a drone, or other form of aircraft, spacecraft, watercraft, or terrestrial vehicle.

In some implementations, the process 3000 can include receiving a flight mode selection input signal, and the control signal can be based in part on the received flight mode selection input signal. For example, the input device 1400 can include a button or switch that allows a user to choose between a pitch (e.g., stabilized) flight mode in which angle commands are sent to the vehicle, and an acrobatic flight mode in which rate commands are sent to the vehicle. In another example, the user can cause the control signal based in part on a skill level switch input. For example, when switched to an “expert” mode, the control signals may be provided substantially without any limits on user input (e.g., a “raw” input mode), and in a “normal” mode the control signals may be mildly rate-limited and/or have limits on pitch, yaw, or roll inputs (e.g., to prevent a crash in case the user drops the input device 1400), and in a “beginner” mode the control signals may be highly rate limited to prevent erratic flight due to imprecise or overexaggerated inputs by a novice user.

In some implementations, the input device 1400 can implement augmented-reality (AR) sensors and functions, such as virtual position sensors. For example, the user may wear or otherwise be within view of machine vision sensors, and the user may grip an input device having a similar physical structure as the example input device 1400. The machine vision sensors can observe the user’s movements of the input device, determine a pitch, yaw, roll, and curl of the user’s fingers, and transform that information into a control signal for use in controlling a remotely operated vehicle.

In some implementations, the input device 1400 can be a virtual reality (VR) input device that uses virtual position sensors. For example, the user may wear a visor with machine vision sensors (e.g., a VR headset). A virtual representation of the example input device 1400 can be projected in front of the user, and the user can reach out to virtually grip and manipulate the VR input device. Movements of the user’s hands can be tracked by machine vision and/or handheld VR controllers, and can be translated into movements of the VR input device and transform that information into a control signal for use in controlling a remotely operated vehicle.

In some implementations, the input device 1400 can include haptic, visual, or audible feedback. For example, the input device 1400 can be configured to vibrate, sound a tone, or illuminate to notify the user when the input device 1400 is oriented in one or more of a neutral, center, default, or “zero” position (e.g., an orientation at which one or more of the rotational axes of the input device 1400 correspond to substantially zero change in pitch, roll, or heading of the remotely operated vehicle).

Figure 31:
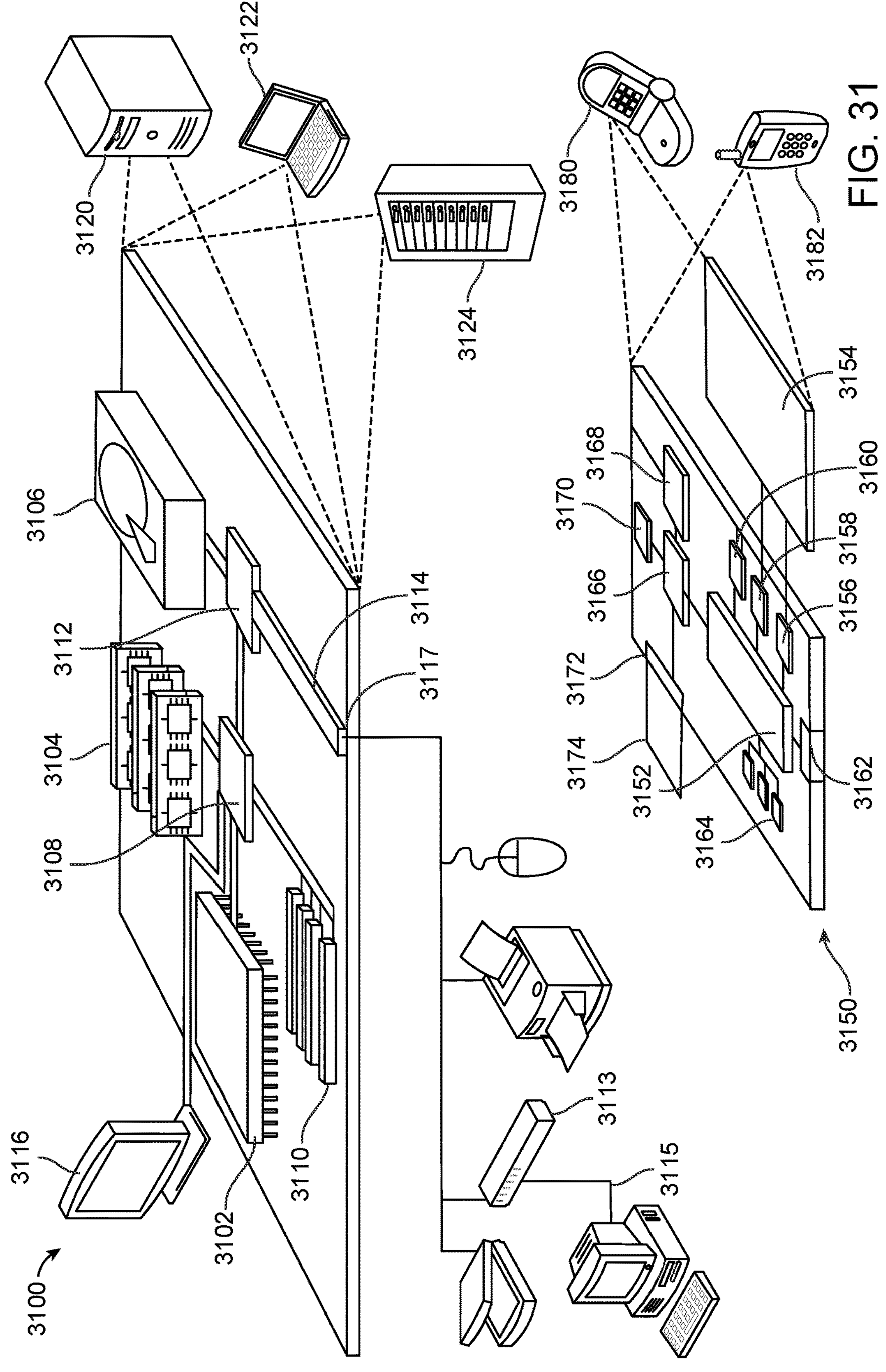
FIG. 31 is a block diagram of example computing devices that may be used to implement the systems and processes described in this document.

FIG. 31 is a block diagram of computing devices 3100, 3100 that may be used to implement the systems and methods described in this document, either as an embedded processing system, a client, or as a server or plurality of servers. Computing device 3100 is intended to represent various forms of digital computers, such as laptops, desktops, workstations, personal digital assistants, servers, blade servers, mainframes, and other appropriate computers. Computing device 3100 can also represent all or parts of various forms of computerized devices, such as embedded digital controllers, media bridges, modems, network routers, network access points, network repeaters, and network interface devices including mesh network communication interfaces. Computing device 3150 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the examples described and/or claimed in this document.

Computing device 3100 includes a processor 3102, a memory 3104, a storage device 3106, a high-speed interface 3108 connecting to memory 3104 and high-speed expansion ports 3110, and a low-speed interface 3112 connecting to a low-speed bus 3114 and storage device 3106. Each of the components 3102, 3104, 3106, 3108, 3110, and 3112, are interconnected using various busses, and may be mounted on a common motherboard or in other manners as appropriate. The processor 3102 can process instructions for execution within the computing device 3100, including instructions stored in the memory 3104 or on the storage device 3106 to display graphical information for a GUI on an external input/output device, such as display 3116 coupled to high-speed interface 3108. In other implementations, multiple processors and/or multiple buses may be used, as appropriate, along with multiple memories and types of memory. Also, multiple computing devices 3100 may be connected, with each device providing portions of the necessary operations (e.g., as a server bank, a group of blade servers, or a multi-processor system).

The memory 3104 stores information within the computing device 3100. In one implementation, the memory 3104 is a computer-readable medium. In one implementation, the memory 3104 is a volatile memory unit or units. In another implementation, the memory 3104 is a non-volatile memory unit or units.

The storage device 3106 is capable of providing mass storage for the computing device 3100. In one implementation, the storage device 3106 is a computer-readable medium. In various different implementations, the storage device 3106 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 3104, the storage device 3106, or memory on processor 3102.

The high-speed controller 3108 manages bandwidth-intensive operations for the computing device 3100, while the low-speed controller 3112 manages lower bandwidth-intensive operations. Such allocation of duties is exemplary only. In one implementation, the high-speed controller 3108 is coupled to memory 3104, display 3116 (e.g., through a graphics processor or accelerator), and to high-speed expansion ports 3110, which may accept various expansion cards (not shown). In the implementation, low-speed controller 3112 is coupled to storage device 3106 and low-speed expansion port 3117 through the low-speed bus 3114. The low-speed expansion port, which may include various communication ports (e.g., Universal Serial Bus (USB), BLUETOOTH, BLUETOOTH Low Energy (BLE), Ethernet, wireless Ethernet (Wi-Fi), High-Definition Multimedia Interface (HDMI), ZIGBEE, visible or infrared transceivers, Infrared Data Association (IrDA), fiber optic, laser, sonic, ultrasonic) may be coupled to one or more input/output devices, such as a keyboard, a pointing device, a scanner, a networking device such as a gateway, modem, switch, or router, e.g., through a network adapter 3113.

Peripheral devices can communicate with the high-speed controller 3108 through one or more peripheral interfaces of the low-speed controller 3112, including but not limited to a USB stack, an Ethernet stack, a Wi-Fi radio, a BLUETOOTH Low Energy (BLE) radio, a ZIGBEE radio, a THREAD radio, an HDMI stack, and a BLUETOOTH radio, as is appropriate for the configuration of the particular sensor. For example, a sensor that outputs a reading over a USB cable can communicate through a USB stack.

The network adapter 3113 can communicate with a network 3115. Computer networks typically have one or more gateways, modems, routers, media interfaces, media bridges, repeaters, switches, hubs, Domain Name Servers (DNS), and Dynamic Host Configuration Protocol (DHCP) servers that allow communication between devices on the network and devices on other networks (e.g., the Internet). One such gateway can be a network gateway that routes network communication traffic among devices within the network and devices outside of the network. One common type of network communication traffic that is routed through a network gateway is a Domain Name Server (DNS) request, which is a request to the DNS to resolve a uniform resource locator (URL) or uniform resource indicated (URI) to an associated Internet Protocol (IP) address.

The network 3115 can include one or more networks. The network(s) may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, General Packet Radio System (GPRS), or one or more television or cable networks, among others. For example, the communication may occur through a radio-frequency transceiver. In addition, short-range communication may occur, such as using a BLUETOOTH, BLE, ZIGBEE, Wi-Fi, IrDA, or other such transceiver.

In some embodiments, the network 3115 can have a hub-and-spoke network configuration. A hub-and-spoke network configuration can allow for an extensible network that can accommodate components being added, removed, failing, and replaced. This can allow, for example, more, fewer, or different devices on the network 3115. For example, if a device fails or is deprecated by a newer version of the device, the network 3115 can be configured such that network adapter 3113 can be updated about the replacement device.

In some embodiments, the network 3115 can have a mesh network configuration (e.g., ZIGBEE). Mesh configurations may be contrasted with conventional star/tree network configurations in which the networked devices are directly linked to only a small subset of other network devices (e.g., bridges/switches), and the links between these devices are hierarchical. A mesh network configuration can allow infrastructure nodes (e.g., bridges, switches, and other infrastructure devices) to connect directly and non-hierarchically to other nodes. The connections can be dynamically self-organized and can self-configure to route data. By not relying on a central coordinator, multiple nodes can participate in the relay of information. In the event of a failure of one or more of the nodes or the communication links between then, the mesh network can self-configure to dynamically redistribute workloads and provide fault-tolerance and network robustness.

The computing device 3100 may be implemented in a number of different forms, as shown in the figure. For example, it may be implemented as a standard server 3120, or multiple times in a group of such servers. It may also be implemented as part of a rack server system 3124. It may also be implemented as part of network device such a modem, gateway, router, access point, repeater, mesh node, switch, hub, or security device (e.g., camera server). In addition, it may be implemented in a personal computer such as a laptop computer 3122. Alternatively, components from computing device 3100 may be combined with other components in a mobile device (not shown), such as device 3150. In some embodiments, the device 3150 can be a mobile telephone (e.g., a smartphone), a handheld computer, a tablet computer, a network appliance, a camera, an enhanced general packet radio service (EGPRS) mobile phone, a media player, a navigation device, an email device, a game console, an interactive or so-called "smart" television, a media streaming device, or a combination of any two or more of these data processing devices or other data processing devices. In some implementations, the device 3150 can be included as part of a motor vehicle (e.g., an automobile, an emergency vehicle (e.g., fire truck, ambulance), a bus). Each of such devices may contain one or more of computing device 3100, 3150, and an entire system may be made up of multiple computing devices 3100, 3150 communicating with each other through a low-speed bus or a wired or wireless network.

Computing device 3150 includes a processor 3152, a memory 3164, an input/output device such as a display 3154, a communication interface 3166, and a transceiver 3168, among other components. The device 3150 may also be provided with a storage device, such as a microdrive or other device, to provide additional storage. Each of the components 3150, 3152, 3164, 3154, 3166, and 3168, are interconnected using various buses, and several of the components may be mounted on a common motherboard or in other manners as appropriate.

The processor 3152 can process instructions for execution within the computing device 3150, including instructions stored in the memory 3164. The processor may also include separate analog and digital processors. The processor may provide, for example, for coordination of the other components of the device 3150, such as control of user interfaces, applications run by device 3150, and wireless communication by device 3150. Suitable processors for the execution of a program of instructions include, by way of example, both general and special purpose microprocessors, and the sole processor or one of multiple processors of any kind of computer. Generally, a processor will receive instructions and data from a read-only memory or a random-access memory or both. The essential elements of a computer are a processor for executing instructions and one or more memories for storing instructions and data. The processor can be supplemented by, or incorporated in, ASICs (application-specific integrated circuits), FPGAs (field programmable gate arrays), PLDs (programmable logic devices)

Processor 3152 may communicate with a user through control interface 3158 and display interface 3156 coupled to a display 3154. The display 3154 may be, for example, a TFT LCD display or an OLED display, or other appropriate display technology. The display interface 3156 may comprise appropriate circuitry for driving the display 3154 to present graphical and other information to a user. The control interface 3158 may receive commands from a user and convert them for submission to the processor 3152. In addition, an external interface 3162 may be provide in communication with processor 3152, so as to enable near area communication of device 3150 with other devices. External interface 3162 may provide, for example, for wired communication (e.g., via a docking procedure) or for wireless communication (e.g., via Bluetooth or other such technologies).

The memory 3164 stores information within the computing device 3150. In one implementation, the memory 3164 is a computer-readable medium. In one implementation, the memory 3164 is a volatile memory unit or units. In another implementation, the memory 3164 is a non-volatile memory unit or units. Expansion memory 3174 may also be provided and connected to device 3150 through expansion interface 3172, which may include, for example, a SIMM card interface. Such expansion memory 3174 may provide extra storage space for device 3150 or may also store applications or other information for device 3150. Specifically, expansion memory 3174 may include instructions to carry out or supplement the processes described above and may include secure information also. Thus, for example, expansion memory 3174 may be provide as a security module for device 3150 and may be programmed with instructions that permit secure use of device 3150. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 3164, expansion memory 3174, or memory on processor 3152.

Device 3150 may communicate wirelessly through communication interface 3166, which may include digital signal processing circuitry where necessary. Communication interface 3166 may provide for communications under various modes or protocols, such as GSM voice calls, Voice Over LTE (VOLTE) calls, SMS, EMS, or MMS messaging, CDMA, TDMA, PDC, WCDMA, CDMA2000, GPRS, WiMAX, LTE, 4G, and/or 5G, among others. Such communication may occur, for example, through radio-frequency transceiver 3168. In addition, short-range communication may occur, such as using a Bluetooth, Wi-Fi, or other such transceiver (not shown) configured to provide uplink and/or downlink portions of data communication. In addition, GPS receiver module 3170 may provide additional wireless data to device 3150, which may be used as appropriate by applications running on device 3150.

Device 3150 may also communicate audibly using audio codec 3160, which may receive spoken information from a user and convert it to usable digital information. Audio codex 3160 may likewise generate audible sound for a user, such as through a speaker, e.g., in a handset of device 3150. Such sound may include sound from voice telephone calls, may include recorded sound (e.g., voice messages, music files, etc.) and may also include sound generated by applications operating on device 3150.

The computing device 3150 may be implemented in a number of different forms, as shown in the figure. For example, it may be implemented as a cellular telephone 3180. It may also be implemented as part of a smartphone 3182, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

Some communication networks can be configured to carry power as well as information on the same physical media. This allows a single cable to provide both data connection and electric power to devices. Examples of such shared media include power over network configurations in which power is provided over media that is primarily or previously used for communications. One specific embodiment of power over network is Power Over Ethernet (POE) which pass electric power along with data on twisted pair Ethernet cabling. Examples of such shared media also include network over power configurations in which communication is performed over media that is primarily or previously used for providing power. One specific embodiment of network over power is Power Line Communication (PLC) (also known as power-line carrier, power-line digital subscriber line (PDSL), mains communication, power-line telecommunications, or power-line networking (PLN), Ethernet-Over-Power (EOP)) in which data is carried on a conductor that is also used simultaneously for AC electric power transmission.

The computing system can include clients and servers. A client and server are generally remote from each other and typically interact through a communication network. The relationship of client and server arises by virtue of computer programs running on the respective computers and having a client-server relationship to each other.

The computing system can include routers, gateways, modems, switches, hub, bridges, and repeaters. A router is a networking device that forwards data packets between computer networks and performs traffic directing functions. A network switch is a networking device that connects networked devices together by performing packet switching to receive, process, and forward data to destination devices. A gateway is a network device that allows data to flow from one discrete network to another. Some gateways can be distinct from routers or switches in that they can communicate using more than one protocol and can operate at one or more of the seven layers of the open systems interconnection model (OSI). A media bridge is a network device that converts data between transmission media so that it can be transmitted from computer to computer. A modem is a type of media bridge, typically used to connect a local area network to a wide area network such as a telecommunications network. A network repeater is a network device that receives a signal and retransmits it to extend transmissions and allow the signal can cover longer distances or overcome a communications obstruction.

As used herein, the terms "circuit" or "circuitry" are used to mean any and every electronic or electrical device (including not only discrete hardware components, but also programmable devices such as a PLD, software executed by a general purpose or special purpose microprocessor, or the like. Nothing in this document, except where otherwise indicated, can be used to suggest that functionality described herein is necessarily implemented purely by hardware components.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A user input device comprising:

a housing comprising an elongate central body having a first axial end and a second axial end opposite the first axial end;

a first hand grip extending substantially axially away from the elongate central body at the first axial end;

a first flexible paddle having a first paddle end affixed to the first hand grip and extending tangentially away from the first hand grip to a second paddle end opposite the first paddle end;

a first deflection sensor configured to identify a first amount of deflection of the first flexible paddle;

a second hand grip extending substantially axially away from the elongate central body at the second axial end;

a second flexible paddle having a third paddle end affixed to the second hand grip and extending tangentially away from the second hand grip to a fourth paddle end opposite the first paddle end;

a second deflection sensor configured to identify a second amount of deflection of the second flexible paddle; and circuitry arranged within the elongate central body and comprising:

an orientation sensor configured to identify one or more of a pitch, a roll, and a yaw of the elongate central body; and a controller configured to receive an orientation sensor signal from the orientation sensor, a first deflection signal from the first deflection sensor, and a second deflection signal from the second deflection sensor, and provide a control signal based on one or more of the orientation sensor signal, the first deflection signal, and the second deflection signal.

2. The user input device of claim 1, wherein the housing defines a cavity comprising communication circuitry configured to receive the control signal.

3. The user input device of claim 1, further comprising:

a first retainer comprising at least a portion of a first loop defining a first opening arranged substantially perpendicular to the first hand grip; and a second retainer comprising at least a portion of a second loop defining a second opening arranged substantially perpendicular to the second hand grip.

4. A method for translating user input into control signals, comprising:

receiving an orientation sensor signal from an orientation sensor;

receiving one or more deflection signals from one or more deflection sensors;

determining a control signal based on one or more of the orientation sensor signal and the one or more deflection signals; and providing the control signal at a control signal output port, wherein the one or more deflection sensors are configured to identify deflection of one or more flexible paddles relative to an elongate central body.

5. The method of claim 4, wherein:

the elongate central body comprises a flexible paddle of the one or more flexible paddles, the flexible paddle having a first paddle end affixed proximal to an axial end of the elongate central body and extending tangentially away from the axial end to a second paddle end opposite the first paddle end;

one or more of the deflection sensors is configured to identify an amount of deflection of the flexible paddle; and the method further comprises deflecting, by a user, the flexible paddle.

6. The method of claim 4, wherein the orientation sensor is configured to identify one or more of a pitch, a roll, and a yaw of the elongate central body.

7. The method of claim 6, wherein the elongate central body comprises a first hand grip extending substantially axially away from the elongate central body at a first axial end and a second hand grip extending substantially axially away from the elongate central body at a second axial end opposite the first axial end, and the method further comprises moving, by a user in physical contact with at least one of the first hand grip and the second hand grip, the elongate central body.

8. The method of claim 4, further comprising controlling at least one of pitch, roll, yaw, and throttle of a remotely operated mechanism based on the control signal.

9. A user input device comprising:

a first sensor configured to identify an orientation of a human hand;

a second sensor configured to receive a variable input from the human hand;

a controller configured to determine the orientation of the human hand based on a first sensor signal from the first sensor, and determine a variable value based on a second input signal from the second sensor, and provide a control signal based on one or more of the orientation and the variable value;

a housing comprising an elongate central body having a first axial end and a second axial end opposite the first axial end;

a first hand grip extending substantially axially away from the elongate central body at the first axial end; and a second hand grip extending substantially axially away from the elongate central body at the second axial end, wherein the first hand grip or the second hand grip is configured to be removably affixed to the human hand.

10. The user input device of claim 9, wherein the first sensor is a machine vision sensor comprising at least one camera configured to capture images of an orientation of the human hand, and wherein the controller is further configured to determine the orientation based on the images captured by the machine vision sensor.

11. The user input device of claim 9, wherein the second sensor is a machine vision sensor comprising at least one camera configured to capture images of an extensile configuration of fingers of the human hand, and wherein the controller is further configured to determine the variable input based on the images captured by the machine vision sensor.

12. A user input device comprising:

an elongate central body having a first axial end and a second axial end opposite the first axial end;

a first end body extending substantially axially away from the elongate central body at the first axial end;

a first flexible body extending tangentially away from the first end body;

a first deflection sensor configured to identify a first amount of deflection of the first flexible body; and circuitry arranged within the elongate central body and comprising:

an orientation sensor configured to identify one or more of a pitch, a roll, and a yaw of the elongate central body; and a controller configured to receive an orientation sensor signal from the orientation sensor, receive a first deflection signal from the first deflection sensor, and provide a control signal based on one or more of the orientation sensor signal and the first deflection signal.

13. The user input device of claim 12, further comprising:

a second end body extending substantially axially away from the elongate central body at the second axial end; and a second flexible body extending tangentially away from the first end body; and a second deflection sensor configured to identify a second amount of deflection of the second flexible body, wherein the controller is further configured to receive a second deflection signal from the second deflection sensor, and provide the control signal based on one or more of the orientation sensor signal, the first deflection signal, and the second deflection signal.

14. The user input device of claim 12, wherein the elongate central body defines a cavity comprising communication circuitry configured to receive the control signal.

15. The user input device of claim 12, further comprising a retainer comprising at least a portion of a first loop defining an opening arranged substantially perpendicular to the first end body.

16. A drone controller comprising:

a central portion comprising an internal measurement unit for outputting multi-axis data;

sensors located at grip positions of the drone controller, for outputting sensor position data;

a processor for generating instructions based on the multi-axis data and the sensor position data; and an interface for communicating the instructions to a drone, wherein one or more of the sensors are deflection sensors configured to identify deflection of one or more flexible paddles relative to the central portion.

17. The drone controller of claim 16, further comprising:

a first retainer comprising:

a first hand grip at a first grip position; and at least a portion of a first loop defining a first opening arranged substantially perpendicular to the first hand grip; and a second retainer comprising:

a second hand grip at a second grip position; and at least a portion of a second loop defining a second opening arranged substantially perpendicular to the second hand grip.

* * * * *